US011929224B2

(12) United States Patent
Yao et al.

(10) Patent No.: US 11,929,224 B2
(45) Date of Patent: Mar. 12, 2024

(54) RELAY COIL ASSEMBLY

(71) Applicant: Xiamen Hongfa Automotive Electronics Co., Ltd., Xiamen (CN)

(72) Inventors: Maosong Yao, Xiamen (CN); Shuai Chen, Xiamen (CN); Liangui Wei, Xiamen (CN); Wenchao Peng, Xiamen (CN)

(73) Assignee: Xiamen Hongfa Automotive Electronics Co., Ltd., Fujian (CN)

( * ) Notice: Subject to any disclaimer, the term of this patent is extended or adjusted under 35 U.S.C. 154(b) by 183 days.

(21) Appl. No.: 17/605,957

(22) PCT Filed: Apr. 24, 2020

(86) PCT No.: PCT/CN2020/086644
§ 371 (c)(1),
(2) Date: Oct. 22, 2021

(87) PCT Pub. No.: WO2020/216321
PCT Pub. Date: Oct. 29, 2020

(65) Prior Publication Data

US 2022/0208495 A1 Jun. 30, 2022

(30) Foreign Application Priority Data

Apr. 25, 2019 (CN) ......................... 201910338684.9
Apr. 25, 2019 (CN) ......................... 201910338696.X
(Continued)

(51) Int. Cl.
*H01H 50/14* (2006.01)
*H01F 5/04* (2006.01)
*H01H 50/44* (2006.01)

(52) U.S. Cl.
CPC ............ *H01H 50/443* (2013.01); *H01F 5/04* (2013.01); *H01H 50/14* (2013.01); *H01H 2050/446* (2013.01)

(58) Field of Classification Search
CPC ................ H01H 50/443; H01H 50/14; H01H 2050/446; H01H 50/021; H01H 2050/046; H01H 50/041; H01H 50/28; H01F 5/04
See application file for complete search history.

(56) References Cited

U.S. PATENT DOCUMENTS 2,649,521 A * 8/1953 Cobb ..................... H01H 50/20 335/126
4,573,880 A * 3/1986 Hirano .................... F25B 31/02 181/403
(Continued)

FOREIGN PATENT DOCUMENTS

CN 205384992 U 7/2016
CN 206379314 U 8/2017
(Continued)

OTHER PUBLICATIONS

Chinese Patent Right Evaluation mailed Jul. 12, 2021, in connection with Chinese Application No. ZL201920579850X.
(Continued)

*Primary Examiner* — Shawki S Ismail
*Assistant Examiner* — Lisa N Homza
(74) *Attorney, Agent, or Firm* — Wolf, Greenfield & Sacks, P.C.

(57) ABSTRACT

A relay coil assembly includes a bobbin having flanges on two ends, an enameled wire wound around bobbin, a coil pin mounted to the flange and having an insertion portion, an enameled wire fixing portion and a signal wire fixing portion, and a signal wire. The signal wire fixing portion is provided with a first engagement recess with an opening facing downward, in which the signal wire is engaged. An inverted hook is provided at one of two recess sidewalls of the first engagement recess, and a slope section is provided at one of the two recess sidewalls of the first engagement recess. The opening gradually enlarges from inside to outside along the slope section, which is capable of squeezing the signal wire into the first engagement recess and the inverted hook is capable of preventing the signal wire from coming out.

18 Claims, 36 Drawing Sheets

(30) Foreign Application Priority Data

Apr. 25, 2019 (CN) ......................... 201910338719.1
Apr. 25, 2019 (CN) ......................... 201910339071.7
Apr. 25, 2019 (CN) ......................... 201920579850.9

(56) References Cited

U.S. PATENT DOCUMENTS 6,057,749 A * 5/2000 Doneghue ............ H01H 50/443
335/83
8,540,385 B2 * 9/2013 Naito ................... H01R 12/721
362/607
2016/0300679 A1 10/2016 Yamagata et al.
2018/0346295 A1 * 12/2018 Kosuga .................... B66D 1/22

FOREIGN PATENT DOCUMENTS

CN 107731626 A 2/2018
CN 108022798 A 5/2018
CN 108447743 A 8/2018
CN 207752946 U 8/2018
CN 208240580 U 12/2018
CN 110459438 A 11/2019
CN 209843615 U 12/2019
EP 11 748 96 A2 1/2002
GB 883203 A 11/1961
JP S55-71005 A 5/1980

OTHER PUBLICATIONS

International Search Report dated Jul. 28, 2020 in connection with International Application No. PCT/CN2020/086644.
Extended European Search Report dated Dec. 8, 2022, in connection with European Application No. 20794801.9.

* cited by examiner

RELAY COIL ASSEMBLY

CROSS REFERENCE TO RELATED APPLICATIONS

This disclosure is a national stage filing under 35 U.S.C. § 371 of International PCT Application No. PCT/CN2020/086644, filed Apr. 24, 2020, which claims priority to five Chinese patent applications, i.e., Application No. 201910338719.9, 201910339071.7, 201910338684.9, 201910338696.1 and 201920579850.X, all of the five Chinese patent applications filed on Apr. 25, 2019. The disclosures of the PCT Application and the five Chinese patent applications are incorporated by reference in their entirety.

TECHNICAL FIELD

The present disclosure relates to the field of a relay.

BACKGROUND

A relay is an electronic control device having a control system (also called an input loop) and a controlled system (also called an output loop). The relay is generally used in automatic control circuits, and thereby actually being an "automatic switch" that controls a larger current by means of a smaller current, so as to perform functions such as automatic adjustment, safety protection, and conversion circuit in the circuits.

The relay generally includes coil assembly comprising a bobbin, an enameled wire and a coil pin. The bobbin has a winding window. The enameled wire is wound at the winding window of the bobbin. The coil pin is mounted to the bobbin. A part of the coil pin extends into the winding window of the bobbin to connect with the enameled wire, and the other part of the coil pin extends out of the bobbin to connect with a driving signal (i.e., controlling signal), to allow the enameled wire work under the driving of the driving signal.

A further relay includes a magnetic circuit and a base. In the prior art, when the magnetic circuit is fixed in the base, split riveting or hot riveting is usually used to realize anti-withdraw after the magnetic circuit is mounted to the base. When using the split riveting, a yoke installed with the coil together is inserted into a through hole of the base, and then ends of the metal part (i.e., the yoke) is split, so as to prevent the magnetic circuit from withdrawing from the base; however, after the use of metal split riveting, the split position is easy to rust and oxidize, which will affect the normal use of the relay. When using the hot riveting, the bobbin is mounted into the base, and a plastic portion on the front or back side of a press-in part (i.e., the bobbin) is hot-melted to make the plastic deform and expand, so as to ensure that the bobbin after being mounted into the base will not withdraw; however, the use of hot riveting cannot achieve over-travel adjustment in the automated assembly process, and cannot realize free correction in the automated assembly process.

In addition, in order to achieve free correction in the automated assembly process, over-travel adjustment is required. For small, ISO, and PCB conventional relays, due to their small parts, a direct method is usually used in the improvement of product free correction, that is, the size of the drop between a pole surface of an iron core and a knife edge of a yoke blade is adjusted slightly to meet the requirements for parameters of the relay. For high-current relays, due to larger volume and parts of the relay itself, and high hardness of the material, the adjustment method in the prior art cannot meet and achieve the purpose for adjustment.

A further relay includes a housing, a base, a coil assembly, an iron core, a yoke, an armature, a moving spring, and a fixed contact piece. The coil assembly is horizontally mounted on the base, corresponding to an axis of the iron core mounting hole of the bobbin of the coil assembly is horizontally arranged. The iron core is mounted in the iron core mounting hole of the bobbin of the coil assembly. An end face of the first end (i.e., a head) of the iron core is set as a pole surface, and the yoke is L-shaped, one side of the yoke is fixed to a second end (i.e., a tail) of the iron core, and the other side of the yoke is fitted to an edge of the winding window on the upper side of the bobbin of the coil assembly. The moving spring is also L-shaped, one side of the moving spring is fixed to the yoke on the other side of the yoke, the other side of the moving spring is fixed to the armature, the upper part of the armature fits at a knife edge of the end of the other side of the yoke, and the upper end of the armature or the moving spring is higher than the other side of the yoke. The housing is mounted on the base and receives the components such as the coil assembly, the iron core, the yoke, the armature and the moving spring within the housing. For the relay with this structure, when the housing is impacted or squeezed from the upper direction, the inner wall of the top surface of the housing will deform downward, to a certain extent, to be pressed on the upper end of the armature or the moving spring, so as to cause the armature or the moving spring stuck and cannot move, and thereby causing the failure of the relay.

A further relay is an electronic control device, being an electrical appliance that causes the controlled quantity to undergo a predetermined step change in an electrical output circuit when changes of an input quantity (i.e., excitation quantity) reach to the specified requirements. With the help of an electromagnetic device installed in the relay, the coil generates a magnetic field by passing a small current to the coil, and the armature is attracted or released by use of the generation or disappearance of the magnetic field, thereby driving movable contacts on the movable contact bridge and fixed contacts on the fixed contact piece terminal to be closed or disconnected, so as to realize the control of high current operation. In the existing relays, on the one aspect, after the contacts of the relay are attracted, there is no corresponding detection assembly to detect whether the contacts are conductive, once the contacts are not conductive or the contacts are bonded, it is difficult to quickly perform detection and feedback when the relay is in use; on the other aspect, the opening and closing of the contacts of the relay also have a certain requirement for the service life, and the existing relays do not count the number of the opening and closing of the contacts of the relay. As reaching the number of failures, accurate application of the relay will be affected.

A further electromagnetic relay is equipped with two fixed contact pieces (functioned as load terminals) on the base, and each of the fixed contact piece is equipped with one fixed contact. The coil in the magnetic circuit is installed horizontally on the base. The iron core has one end provided with a pole surface, and the other end fixed to the yoke. The yoke is L-shaped. Except for the first portion of the L-shaped yoke is fixed to the other end of the iron core, the second portion of the L-shaped yoke is arranged next to the coil (that is, outside the winding window of the bobbin), and the end of the second portion of the L-shaped yoke is used as a knife edge of the yoke to match the armature. A flexible moving spring is also bent into a roughly L-shape. The first portion of the L-shaped moving spring is fixed with the second portion of the L-shaped yoke, and the second portion of the L-shaped moving spring is fixed with the armature, so that the armature can be attracted to the pole surface of the iron core by taking the knife edge of the yoke as a rotation axis, and the second portion of the L-shape moving spring is provided with a bridge piece, and both ends of the bridge piece are provided with a movable contact for bridging the fixed contacts on the two fixed contact pieces. When the electromagnetic relay with this structure is used in a high current environment, an arc is relatively large when the contacts are broken, and the product is prone to failure.

SUMMARY

A relay coil assembly includes a bobbin, an enameled wire, a coil pin and a signal wire; flanges are respectively provided on two ends of the bobbin, a winding window of the bobbin is formed between the two flanges, and the enameled wire is wound in the winding window; the coil pin comprises an insertion portion, an enameled wire fixing portion, and a signal wire fixing portion, and the coil pin is mounted to the flange on one of the ends of the bobbin through the insertion portion; the signal wire fixing portion is provided with a first engagement recess with an opening facing downward; the signal wire is engaged in the first engagement recess; an inverted hook is provided at one of two recess sidewalls of the first engagement recess and near an edge of the opening, and a slope section is provided at one of the two recess sidewalls of the first engagement recess at a location corresponding to the signal wire, the opening gradually enlarges from inside to outside along the slope section, so that when a force is applied to outside of one of the recess sidewalls provided with the inverted hook, the slope section is capable to squeeze the signal wire into the first engagement recess and the inverted hook is capable to prevent the signal wire from coming out.

After the signal wire is engaged in the first engagement recess of the coil pin, the signal wire is fixed to the coil pin by means of welding.

In the first engagement recess, both the slope section and the inverted hook are provided on one recess sidewall of the first engagement recess, and the other recess sidewall of the first engagement recess is configured as a straight-surfaced wall.

There is one inverted hook.

There are plurality of inverted hooks, and the plurality of inverted hooks are arranged in order inwardly from an edge of the opening.

Furthermore, the coil pin further includes an electronic component fixing portion, the electronic component fixing portion is provided with a second engagement recess having an opening facing downward, and the second engagement recess is provided on a side of the first engagement recess.

The straight-surfaced wall of the first engagement recess is closer to the second engagement recess than the recess sidewall having the slope section of the first engagement recess.

The coil pin is a sheet-shaped structure; an iron core mounting hole of a bobbin has a horizontally arranged axis; the insertion portion is provided at an upper middle portion of the coil pin and fitted into a fitting recess of the flange on one of ends of the bobbin; the signal wire fixing portion and the electronic component fixing portion are provided on a lower part of the coil pin; a middle part of the coil pin extends to one side to form the enameled wire fixing portion which is bent to the winding window of the bobbin after the coil pin is mounted to the bobbin.

The enameled wire fixing portion of the coil pin is further provided with a first tooth-shaped structure for positioning and winding the enameled wire.

The insertion portion of the coil pin is further provided with a second tooth-shaped structure for realizing an interference fit with the fitting recess of the bobbin.

Compared with the prior art, the present disclosure has beneficial effects:

1. According to the present disclosure, since an inverted hook is provided near an edge of the opening and at one of two recess sidewalls of the first engagement recess, and a slope section along which the opening gradually enlarges from inside to outside is provided at a location corresponding to the signal wire at one of the two recess sidewalls of the first engagement recess, so that when a force is applied to outside of one of the recess sidewalls provided with the inverted hook, the slope section is capable to squeeze the signal wire into the first engagement recess and the inverted hook is capable to prevent the signal wire from coming out. Due to the structure of the present disclosure, with the slope treatment within the first engagement recess, corresponding to forming a triangular area, after the flexible signal wire is pressed into the first engagement recess from the opening of the first engagement recess along the edge of the inverted hook, by squeezing the outside of one of the recess sidewalls of the first engagement recess with the inverted hook, the inverted hook of the recess sidewall is deformed toward the other recess sidewall, so that a space in the recess becomes smaller, and the signal wire is in an interference fit with the first engagement recess, so that the signal wire is stuck and thereby not easy to fall off.
2. According to the present disclosure, after the signal wire is engaged in the first engagement recess of the coil pin, the signal wire is fixed with the coil pin by means of welding. The structure of the present disclosure forms a double insurance of engaging and welding, without having virtual welding happened, so that the connection between the signal wire and the coil pin is more reliable.
3. According to the present disclosure, the enameled wire fixing portion of the coil pin is also provided with a first tooth-shaped structure which is convenient for positioning and winding the enameled wire. This structure of the present disclosure controls a starting position of a first loop of the enameled wire by means of the first tooth-shaped structure so as to avoid the overlapping of the enameled wire and the bobbin and prevent the enameled wire from being stuck when the enameled wire is wound and then bent.

The present disclosure also provides a high-current relay with an adjustable over-travel, through the structural improvement, on the one hand, to avoid the deficiencies of the prior art caused by use of the split riveting on the basis of stable fixation between the magnetic circuit and the base; on the other hand, to realize the over-travel adjustment of the high-current relay.

The high-current relay with adjustable over-travel of the present disclosure includes a bobbin, a moving spring armature and a base. An axis of an iron core mounting hole of the bobbin is horizontally arranged, and flanges are respectively provided on both ends of the bobbin, and a winding window is formed between the two flanges. The moving spring armature is installed together with the bobbin such that the movable contacts of the moving spring armature is in a matting state with the fixed contacts on the outside of one end of the bobbin. A first hook member is provided downwardly on the flange at one end of the bobbin, and a first engagement hole is provided at the corresponding position of the base. The first hook member of the bobbin is fitted into the first engagement hole of the base such that an integral part including the bobbin and the moving spring armature is restricted along a vertical direction and a horizontal direction perpendicular to the axis of the iron core mounting hole at a location corresponding to the first engagement hole, and there is a movable first gap along the axis of the iron core mounting hole. A second hook member is downwardly provided on the flange at the other end of the bobbin, and a second engagement hole is provided at the corresponding position of the base, and the second hook member of the bobbin is fitted in the second engagement hole of the base such that the integral part is restricted along the vertical direction and the horizontal direction perpendicular to the axis of the iron core mounting hole at a location corresponding to the second engagement hole, and there is movable second gap along the axis of the iron core mounting hole; so that the over-travel adjustment of the contacts can be achieved by use of the first gap and the second gap.

The first hook member is set to one, and is arranged directly below the axis of the iron core mounting hole. The second hook members are set to two, and are symmetrically arranged on the two sides directly below the axis of the iron core mounting hole.

The first hook member includes two hooks facing oppositely and a first avoidance recess between the two hooks so that the corresponding hook can swing elastically; and hook heads of the two hooks face respectively the two sides directly below the axis of the iron core mounting hole.

A first snap hole with a stepped surface facing downward is respectively provided at a location corresponding to the hook head at the bottom of the first engagement hole. Fins for preventing overpressure are provided toward the two sides at the upper part of the first hook member. When the first hook member is fitted into the first engagement hole, the hook head of the first hook member is hooked at the first snap hole of the first engagement hole, and the fins on the two sides of the first hook member abut against the base along an edge next to the edge of the upper hole of the first engagement hole, such that the integral part is vertically limited at the location corresponding to the first engagement hole.

The first hook member is in transitional fit with two opposite hole walls of the first engagement hole along a horizontal direction perpendicular to the axis of the iron core mounting hole, so that the integral member is restricted along the horizontal direction perpendicular to the axis of the iron core mounting hole at the location corresponding to the first engagement hole.

The second hook member includes a hook head facing the outside of the bobbin and a second avoidance recess arranged beside the hook to allow the hook to elastically swing in the direction of the inside of the bobbin.

A second snap hole with a stepped surface facing downward is respectively provided at a location corresponding to the hook head at the bottom of the second engagement hole. A third step for preventing overpressure and having stepped surface facing downward are provided at the upper part of the second hook member. When the second hook member is fitted into the second engagement hole, the hook head of the second hook member is hooked at the second snap hole of the second engagement hole, and the third steps of the second hook member abut against the base along an edge next to the edge of the upper hole of the second engagement hole, such that the integral part is vertically limited at the location corresponding to the second engagement hole.

The second hook member is in transitional fit with the two opposite hole walls of the second engagement hole along the horizontal direction perpendicular to the axis of the iron core mounting hole at a location corresponding to the second engagement hole. One of the two opposite hole walls of the second engagement hole along the horizontal direction perpendicular to the axis of the iron core mounting hole is also set as a wave-shaped wall surface, so that after the over-travel adjustment of the contacts can be achieved by use of the first gap and the second gap, the heat-melting treatment between the wave-shaped wall surface of the second engagement hole and the second hook member is performed to fix the second hook member with the base together so that the integral part is simultaneously restricted along the axis of the iron core mounting hole and the horizontal direction perpendicular to the axis of the iron core mounting hole at the location corresponding to the second engagement hole, and fine adjustment of the integral part along the horizontal direction perpendicular to the axis of the iron core mounting hole at the location corresponding to the second engagement hole can be achieved by means of the wave-shaped wall surface.

Further, a yoke is also included. The yoke is provided with a mounting leg which is fitted in the second engagement hole together with the second hook member, and the mounting leg of the yoke is closer to directly below the axis of the iron core mounting hole with respect to the second hook member; the other one of the two opposite hole walls of the second engagement hole along the horizontal direction perpendicular to the axis of the iron core mounting hole is farther away from directly below the axis of the iron core mounting hole with respect to the other one.

Compared with the prior art, the present disclosure has beneficial effects:

1. According to the present disclosure, a first hook member is provided downwardly on the flange at one end of the bobbin, and a first engagement hole is provided at the corresponding position of the base. The first hook member of the bobbin is fitted into the first engagement hole of the base such that an integral part including the bobbin and the moving spring armature is restricted along a vertical direction and a horizontal direction perpendicular to the axis of the iron core mounting hole at a location corresponding to the first engagement hole, and there is a movable first gap along the axis of the iron core mounting hole. A second hook member is downwardly provided on the flange at the other end of the bobbin, and a second engagement hole is provided at the corresponding position of the base, and the second hook member of the bobbin is fitted in the second engagement hole of the base such that the integral part is restricted along the vertical direction and the horizontal direction perpendicular to the axis of the iron core mounting hole at a location corresponding to the second engagement hole, and there is movable second gap along the axis of the iron core mounting hole; so that the over-travel adjustment of the contacts can be achieved by use of the first gap and the second gap. This structure of the present disclosure can achieve the hook fixation between the bobbin and the base, avoid the deficiencies of the prior art caused by use of the split riveting and realize the over-travel adjustment of the high-current relay.

2. According to the present disclosure, the first hook member is set to one, and is arranged directly below the axis of the iron core mounting hole. The second hook member is set to two, and are symmetrically arranged on the two sides directly below the axis of the iron core mounting hole. With this structure of the present disclosure, through three-point coordination between the bobbin and the base, a stable connection can be obtained between the bobbin and the base.
3. According to the present disclosure, the first hook member includes two hooks facing oppositely and a first avoidance recess between the two hooks so that the corresponding hook can swing elastically; and hook heads of the two hooks face respectively the two sides directly below the axis of the iron core mounting hole. The second hook member includes a hook head facing the outside of the bobbin and a second avoidance recess arranged beside the hook to allow the hook to elastically swing in the direction of the inside of the bobbin. With this structure of the present disclosure, when the bobbin is pressed into the base, and the first hook member is inserted into the first engagement hole, the two hook heads of the first hook member are deformed towards the middle direction, and when the second hook member is inserted into the second engagement hole, the hook heads of the second hook member are deformed toward the direction of the contacts, thereby reducing the difficulty of assembly between the bobbin and the base and solving the generation of plastic foreign objects during assembly.
4. According to the present disclosure, one of the two opposite hole walls of the second engagement hole along the horizontal direction perpendicular to the axis of the iron core mounting hole is also set as a wave-shaped wall surface. With this structure of the present disclosure, one recess sidewall of the second engagement hole is designed as a wave-shaped structure, and after the over-travel is adjusted, the second hook member is heat-melted, and the hot melt of the second hook member fills the wave-shaped surface, so that the integral part can be simultaneously restricted along the axis direction of the iron core mounting hole and the horizontal direction perpendicular to the axis of the iron core mounting hole at the location corresponding to the second engagement hole, at the same time, the wave-shaped surface can increase a mating area of the hot-melt substances between the second engagement hole and the hook, and thereby enhancing the fixing strength.

The present disclosure also provides a relay that can ensure a normal operation of the armature. Such improved structure can avoid a phenomenon that the armature or the moving spring is stuck, and ensure the normal operation of the armature or the moving spring, and thereby ensuring the normal use of the relay.

The relay of the present disclosure that can ensure the normal operation of the armature or the moving spring includes a housing, a base, a coil assembly, an iron core, a yoke, an armature, and a moving spring. The coil assembly is horizontally installed on the base. The iron core is installed in the iron core mounting hole of the coil assembly, and the end face of the first end of the iron core is set as a pole surface. The first portion of the yoke is fixed to the second end of the iron core, and the second portion of the yoke is fitted over the coil assembly. The first end of the moving spring is fixed with the second portion of the yoke, and the second end of the moving spring is fixed with the armature, and the armature corresponds to the pole surface of the iron core and the upper part of the armature is fit at a knife edge of the yoke, and the upper end of the armature is higher than the top surface of the second portion of the yoke and the moving spring, or the upper end of the moving spring is higher than the top surface of the second portion of the yoke and the armature. The housing is installed on the base and receives the coil assembly, the iron core, the yoke, the armature and the moving spring therein. A downwardly protruding protrusion that can abut against the upper surface of the second portion of the yoke is provided in an inner side surface of the top of the housing. A distance between the bottom surface of the protrusion and the upper surface of the second portion of the yoke is smaller than a distance between the inner side surface of the top of the housing and the upper end of the armature or the moving spring, so that when the housing is deformed downward, the protrusion abuts against the upper surface of the second portion of the yoke, so as to ensure that the housing cannot press the armature or the moving spring.

There are three protrusions on the inner side surface of the top of the housing, and are distributed in a triangle shape.

In the housing, limiting ribs that are capable to fit on both sides of the second portion of the yoke are provided in the side walls corresponding to the axis of the iron core mounting hole of the coil assembly, and a preset gap is provided between the limiting rib and the corresponding side of the second portion of the yoke, to prevent the magnetic circuit including the yoke from moving in a preset direction.

The yoke is L-shaped, and one side of the L-shaped yoke serves as a first portion of the yoke, which is fixed to the second end of the iron core, and the other side of the L-shaped yoke serves as a second part of the yoke, which is fitted on the upper side of the coil assembly. the moving spring is L-shaped, and one side of the L-shaped moving spring serves as a first portion of the moving spring, which is fixed to the yoke over the second portion of the yoke, and the other side of the L-shape of the moving spring is used as a second portion of the moving spring, which is fixed to the armature.

The two sides of the end of the second portion of the yoke respectively extend outwardly and are provided with protruding columns, and a knife edge of the yoke is formed between the two protruding columns. A first groove is respectively provided on the both sides of the upper part of the armature. The first grooves on both sides of the upper part of the armature are respectively matched with the two protruding columns at the end of the second portion of the yoke, so that the upper part of the armature fits at the knife edge of the yoke.

A second groove is provided at a top end of the armature, and the first portion of the moving spring crosses the second groove at the top end of the armature so that the upper end of the armature is higher than the top surface of the second portion of the yoke and moving spring.

A stopper for limiting the top of the armature is also provided in the first portion of the moving spring, so as to limit the upper part of the armature at the knife edge of the yoke.

The two sides of the end of the second portion of the yoke respectively extend outwardly and are provided with protruding columns, and a cut of the yoke is formed between the two protruding columns. Shoulders are respectively provided on both sides of the upper part of the armature. The shoulders on both sides of the upper part of the armature are respectively matched with the two protruding columns at the end of the second portion of the yoke, so that the upper part of the armature is fit at the knife edge of the yoke.

The first portion of the moving spring crosses the top end of the armature, so that the upper end of the moving spring is higher than the top surface of second portion of the yoke and the armature.

Compared with the prior art, the present disclosure has beneficial effects:

1. According to the present disclosure, a downwardly protruding protrusion that can abut against the upper surface of the second portion of the yoke is provided in an inner side surface of the top of the housing. A distance between the bottom surface of the protrusion and the upper surface of the second portion of the yoke is smaller than a distance between the inner side surface of the top of the housing and the upper end of the armature or the moving spring. With this structure of the present disclosure, when the top of the housing is deformed by force, the housing can simultaneously move the protrusion downwards to be in a first contact with the yoke, to avoid contact between the housing and the armature or the moving spring, and jamming the armature or the moving spring, and ensure the normal operation of the armature or the moving spring, thereby ensuring the normal use of the relay.
2. According to the present disclosure, there are three protrusions on the inner side surface of the top of the housing, and are distributed in a triangle shape. This structure of the present disclosure can ensure that the top of the housing when being deformed under force is in smooth contact with the yoke, and that the housing is not in contact with the armature or the moving spring, and ensure the normal operation of the armature or the moving spring.
3. According to the present disclosure, in the housing, limiting ribs that are capable to fit on both sides of the second portion of the yoke are provided in the side walls corresponding to the axis of the iron core mounting hole of the coil assembly, and a preset gap is provided between the limiting rib and the corresponding side of the second portion of the yoke. This structure of the present disclosure can prevent the magnetic circuit including the yoke from moving in a preset direction.

A high-current relay with signal monitoring on load terminals of the present disclosure includes a machine core and a base. The machine core includes a magnetic circuit and a moving spring armature operated by the magnetic circuit. The base includes two fixed contact pieces and a plastic body that fixes the two fixed contact pieces insulated from each other together by an injection molding. The fixed contact pieces are provided with fixed contacts. The machine core is installed on the base, and the movable contacts of the moving spring armature of the machine core are matched with the fixed contacts of the fixed contact pieces, so that when the contacts are closed, the current flows in from the load terminal of one of the fixed contact pieces and flows out from the load terminal of the other of the fixed contact pieces. The two fixed contact pieces are also provided with a protruding part that protrudes upward and is not covered by the plastic body, and the protruding parts of the two fixed contact pieces are respectively connected with a signal wire, to realize signal collection of the closed state of the contacts and the number of opening and closing times of the contacts.

The moving spring armature includes a bridge piece and movable contacts arranged at both ends of the bridge piece. The static spring has a sheet-shaped structure and includes a main body buried horizontally in the plastic body, a contact part bent to be exposed over the plastic body, and a connection part exposed horizontally from the side of the plastic body as a load terminal. The fixed contacts are provided at the contact part. The two ends of the bridge piece of the machine core respectively correspond to the contact parts of the two fixed contact pieces. The protruding part is provided on the main body of the static spring.

A metal conductive sheet is also provided between the signal wire and the protruding part of the static spring. The metal conductive sheet is provided with a first through hole fitted to the protruding part of the static spring. The metal conductive sheet is connected to the protruding part of the static spring by means of welding or riveting.

One end of each of the two signal wires is connected to a corresponding metal conductive sheet, and the other end of each of the two signal wires is connected to a connector, and connected to a control module outside the relay by means of the connector.

The protruding part of the static spring and the main body of the static spring are an integral structure, which is formed by tapping the main body of the static spring upward from the bottom surface.

In the plastic body, a relief area is also provided on the periphery corresponding to the protruding parts of the two fixed contact pieces, and the protruding parts of the two fixed contact pieces are respectively sleeved with springs, and the springs are compressed between the metal conductive sheet and the main body of the static spring in the corresponding relief areas, so as to increase the electrical contact area between the metal conductive sheet and the static spring by means of the spring.

The protruding part of the static spring and the main body of the static spring are separate parts. The protruding part of the static spring is a metal rivet, and the corresponding position of the main body of the static spring is provided with a second through hole. The metal rivet is fitted in the second through hole of the main body of the static spring, and the bottom of the metal rivet is riveted and matched with the second through hole of the main body of the static spring.

A step is provided on the top of the metal rivet, and the first through hole of the metal conductive sheet is fitted at the step of the metal rivet.

The signal wire is a flexible wire.

Compared with the prior art, the present disclosure has beneficial effects:

1. According to the present disclosure, the main bodies of the two fixed contact pieces are also provided with a protruding part that protrudes upward and is not covered by the plastic body, and the protruding parts of the two fixed contact pieces are respectively connected with a signal wire, to realize signal collection of the closed state of the contacts and the number of opening and closing times of the contacts. With this structure of the present disclosure, by adding a simple device of signal lead-out wire on the static spring, when the contacts are closed, the two signal wires are communicated, and the communicated signals of the two signal wires can be collected, on the one hand, to monitor the state of the contacts in real time, determine whether the relay is in normal work, and check the risks timely; on the other hand, to collect and count the number of opening and closing times of the relay, when the number of failures is reached, it can automatically remind replacement or repair, so as to ensure the normal application of the relay. The present disclosure allows the relay to possess a signal monitoring function.

2. According to the present disclosure, the protruding part of the static spring and the main body of the static spring are separate parts; the protruding part of the static spring is a metal rivet, and the corresponding position of the main body of the static spring is provided with a second through hole; the metal rivet is fitted in the second through hole of the main body of the static spring, and the bottom of the metal rivet is riveted and matched with the second through hole of the main body of the static spring. This structure of the present disclosure is convenient for manufacturing the protruding parts of the fixed contact pieces, and when the protruding parts of the fixed contact pieces are matched with the metal conductive sheet, it will not cause damage to the plastic body. Since the metal rivet is a solid body, the stability of the contact between the metal conductive sheet and the protruding parts of the fixed contact pieces can be improved.
3. According to the present disclosure, a step is provided on the top of the metal rivet, and the first through hole of the metal conductive sheet is fitted to the step of the metal rivet. With the structure of the present disclosure, the conductive area of the metal conductive sheet and the static spring can be increased by means of the step of the metal rivet, so as to improve the reliability of conduction.
4. According to the present disclosure, in the plastic body, a relief area is also provided on the periphery corresponding to the protruding parts of the two fixed contact pieces, and the protruding parts of the two fixed contact pieces are respectively sleeved with springs, and the springs are compressed between the metal conductive sheet and the main body of the static spring in the corresponding relief areas. With this structure of the present disclosure, by use of the deformability of the spring, the spring after being deformed is always in contact with the metal conductive sheet and the main body of the static spring, so as to ensure a reliable connection between a signal diagnostic terminal (i.e., the metal conductive sheet) and a load terminal (i.e., the main body of the static spring), further ensure the transmission of the diagnostic signal, and thereby ensuring effective reading of the monitoring signal by the system.
5. According to the present disclosure, the signal wire is a flexible wire, and one end of the signal wire is connected to the metal conductive sheet, and the other end of the signal wire is connected to a connector. The present disclosure uses the flexible wire to eliminate stress generated between the hard connections (a direct connection between the metal sheets easily causes falling off, thereby improving the reliability of connection.

The present disclosure will be further described in detail below with reference to the accompanying drawings and embodiments; however, a high-current relay with signal monitoring on load terminals of the present disclosure is not limited to these embodiments.

The bridge-type high-current electromagnetic relay of the present disclosure includes a base, two fixed contact pieces with rigid characteristics mounted on the base, a coil horizontally mounted on the base, and a moving spring with flexible characteristics connected between the armature and the yoke fit to the vicinity of the coil. A bridge piece with rigid characteristics is also fixed at an end of the moving spring connected to the armature. The two ends of the bridge piece respectively correspond to the two fixed contact pieces, and each of the fixed contact pieces is provided with two fixed contacts, the two ends of the bridge piece are respectively provided with two movable contacts, and the four movable contacts are arranged in a row. When the coil works to allow the two ends of the bridge piece to be in contact with the two fixed contact pieces, the two movable contacts on the both ends of the bridge piece are respectively in a corresponding contact with the two fixed contacts on the two fixed contact pieces.

The two movable contacts on both ends of the bridge piece and the two fixed contacts on the two fixed contact pieces are respectively configured to have a square structure.

Contact surfaces of the two movable contacts on both ends of the bridge piece and the two fixed contacts on the two fixed contact pieces are respectively configured as arc surfaces protruding outward.

The yoke is L-shaped, one side of the L-shaped yoke is a first portion that is fixed to the iron core, and the other side of the L-shaped yoke is a second portion that is arranged over the coil.

The two fixed contact pieces are respectively arranged between the bridge piece and the coil.

The two fixed contact pieces are respectively installed symmetrically on both sides of the base.

In the base, a stopper is also installed on a side corresponding to the bridge piece and facing away from the movable contact.

In the stopper, a buffer pad is also installed.

Compared with the prior art, the present disclosure has beneficial effects:

1. According to the present disclosure, each of the fixed contact pieces is provided with two fixed contacts, the two ends of the bridge piece are respectively provided with two movable contacts, and the four movable contacts are arranged in a row. When the coil works to allow the two ends of the bridge piece to be in contact with the two fixed contact pieces, the two movable contacts on the both ends of the bridge piece are respectively in a corresponding contact with the two fixed contacts on the two fixed contact pieces. With the structure of the present disclosure, each of the load terminals (i.e., fixed contact pieces) is simultaneously provided with two contacts connected in parallel, and correspondingly, the bridge piece of the movable spring is provided with four contacts, and the contacts on the bridge piece correspond to the contacts on the load terminal respectively. The two load terminals (i.e., fixed contact pieces) are connected in series through the bridge piece. When the contacts are communicated in the load terminal, the contacts are connected in parallel to make the equivalent resistance halved (also equivalent to current shunt to improve the current-carrying capacity), so that under the same current condition, the power consumption is reduced by ½, thereby greatly reducing the power consumption of the contacts, that is, reducing the heating at the contacts, thereby improving the product performance (i.e., the load capacity is higher. The two load terminals are connected in series with the help of the bridge piece, so that synchronous disconnection of the current loop makes the appeared arc energy halved, so as to achieve the purpose of reducing the arcing when the contacts are broken.
2. According to the present disclosure, the two movable contacts on both ends of the bridge piece and the two fixed contacts on the two fixed contact pieces are respectively configured to have a square structure, and the contact surfaces of the two movable contacts on both ends of the bridge piece and the two fixed contacts on the two fixed contact pieces are respectively configured as arc surfaces protruding outward. With the structure of the present disclosure, contact between the movable and fixed contacts is configured to be in a line contact by the cooperation of the square structure and the arc-shaped surface, so as to improve the reliability of the contact between the movable and fixed contacts.

3. According to the present disclosure, a bridge piece with rigid characteristics is fixed to the end of the moving spring connected with the armature, and the two ends of the bridge piece correspond to the two fixed contact pieces respectively. With this structure of the present disclosure, the moving spring only bear the mechanical fatigue strength of back and forth movement of the moving spring but not bear the current-carrying capacity, while the bridge piece only bears the current-carrying capacity but not the load-resistant mechanical fatigue capacity. In the case of the same arc extinguishing capability, the materials of the moving spring can be randomly selected but not limited to a special material, and the load circuit path is shorter (the current only flows through the bridge piece and not through the moving spring), that is, the shorter path has a smaller resistance, so under the same load (current) condition, the heating amount will be smaller.

The above and other features and advantages of the present disclosure will become more apparent by describing the preferred embodiments with reference to the following accompanying drawings.

BRIEF DESCRIPTION OF THE DRAWINGS

The above and other features and advantages of the present disclosure will become more apparent by describing in detail the exemplary embodiments thereof with reference to the accompanying drawings.)

DETAILED DESCRIPTION

Figure 1:
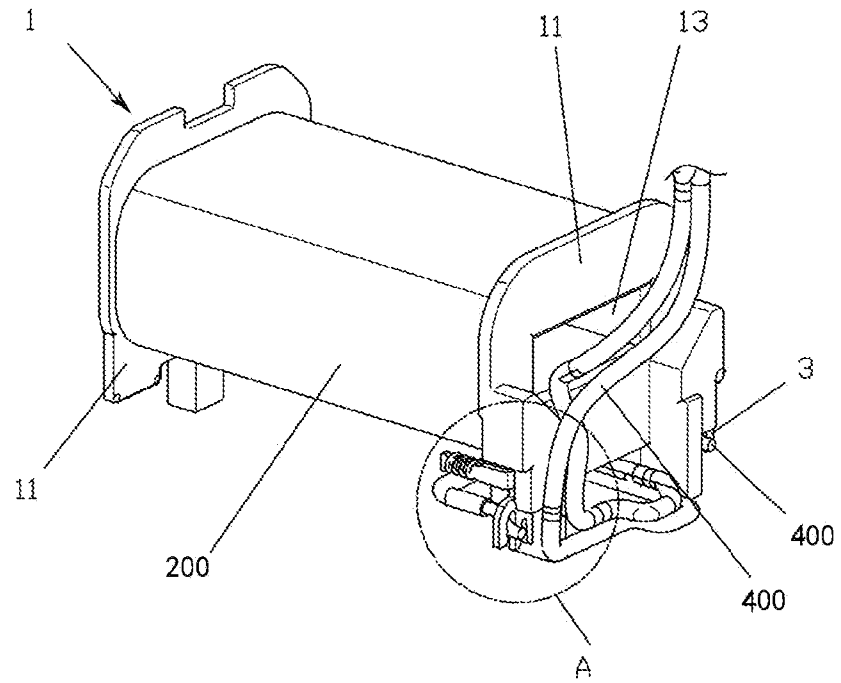
FIG. 1 is a schematic perspective view of a first embodiment of a relay coil assembly according to the present disclosure.
Figure 2:
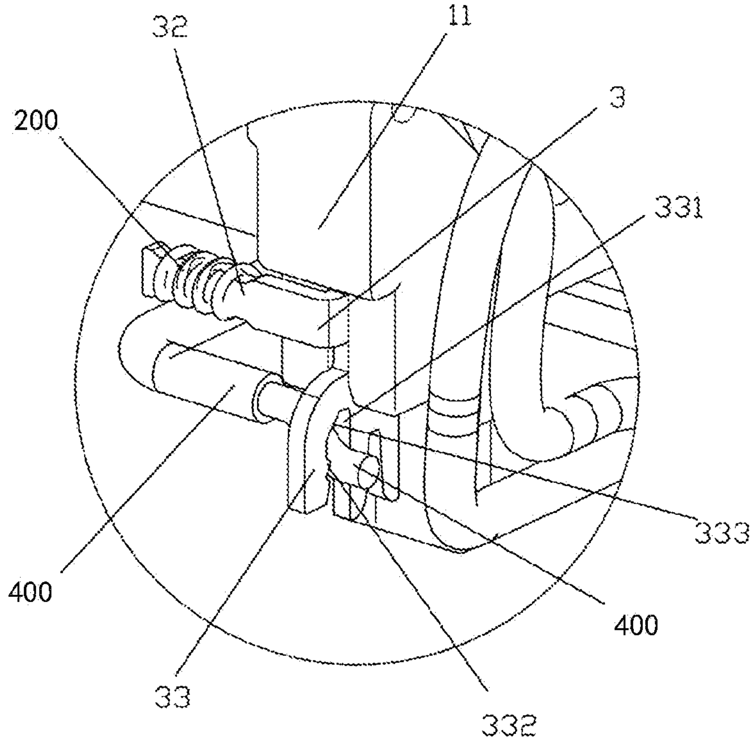
FIG. 2 is an enlarged schematic view of part A in FIG. 1.
Figure 3:
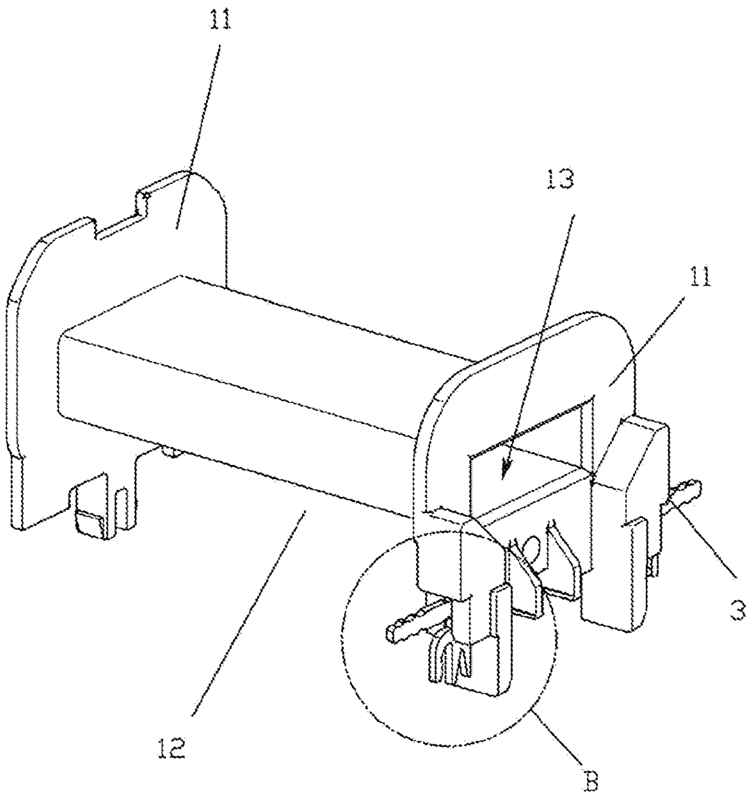
FIG. 3 is a schematic view of cooperation of a bobbin and a coil pin according to the first embodiment of the present disclosure.
Figure 4:
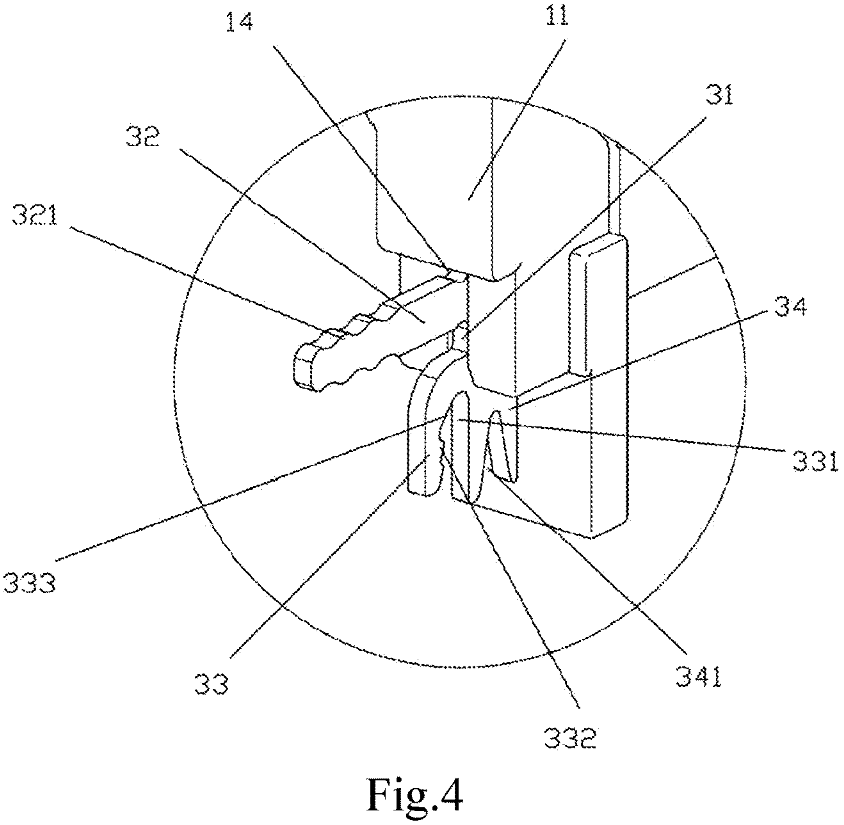
FIG. 4 is an enlarged schematic view of part B in FIG. 3.
Figure 5:
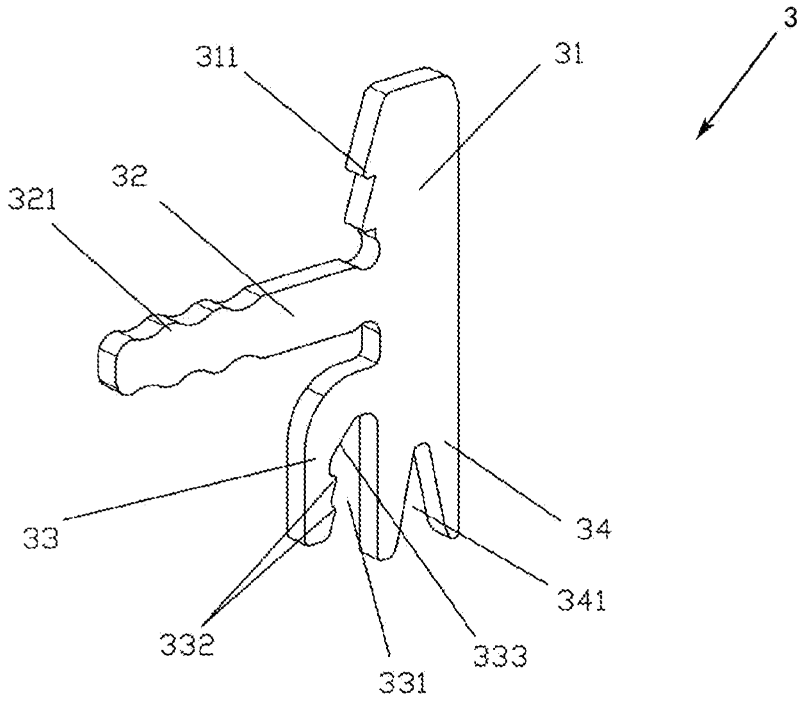
FIG. 5 is a schematic perspective view of the coil pin according to the first embodiment of the present disclosure.
Figure 6:
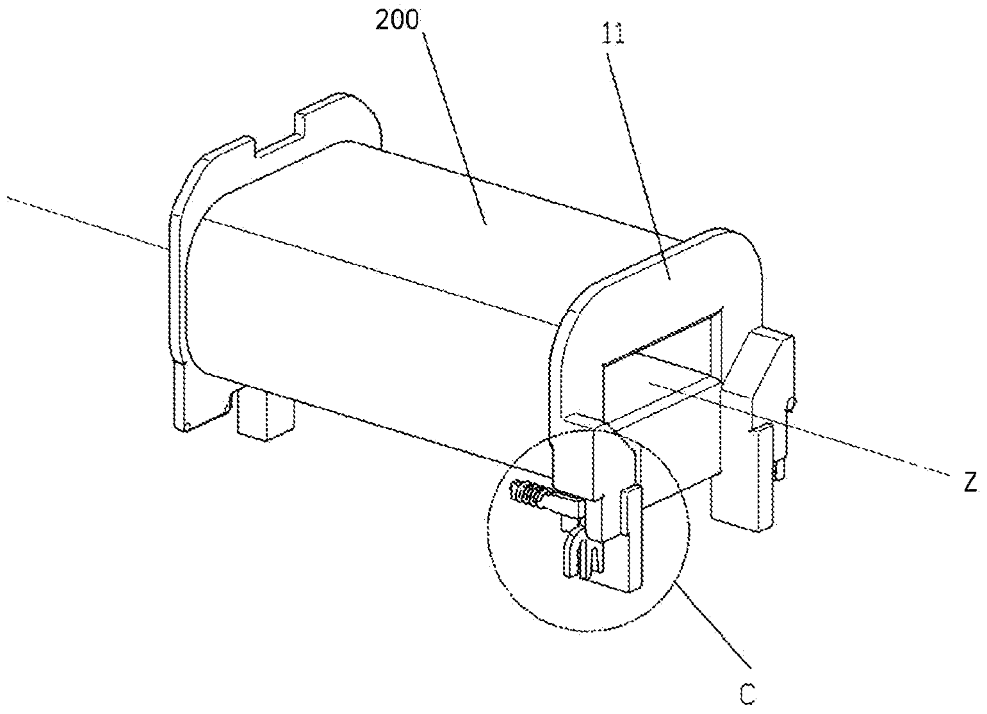
FIG. 6 is a schematic view of cooperation of a bobbin, an enameled wire and a coil pin according to the first embodiment of the present disclosure.
Figure 7:
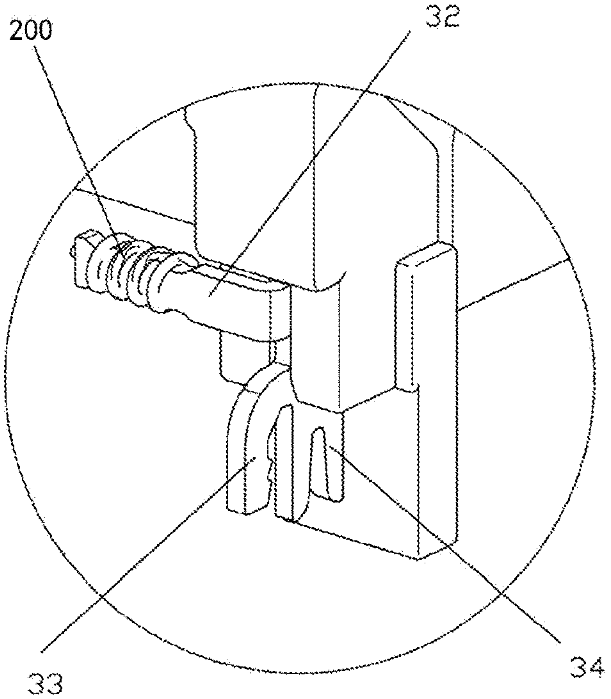
FIG. 7 is an enlarged schematic view of part C in FIG. 6.
Figure 8:
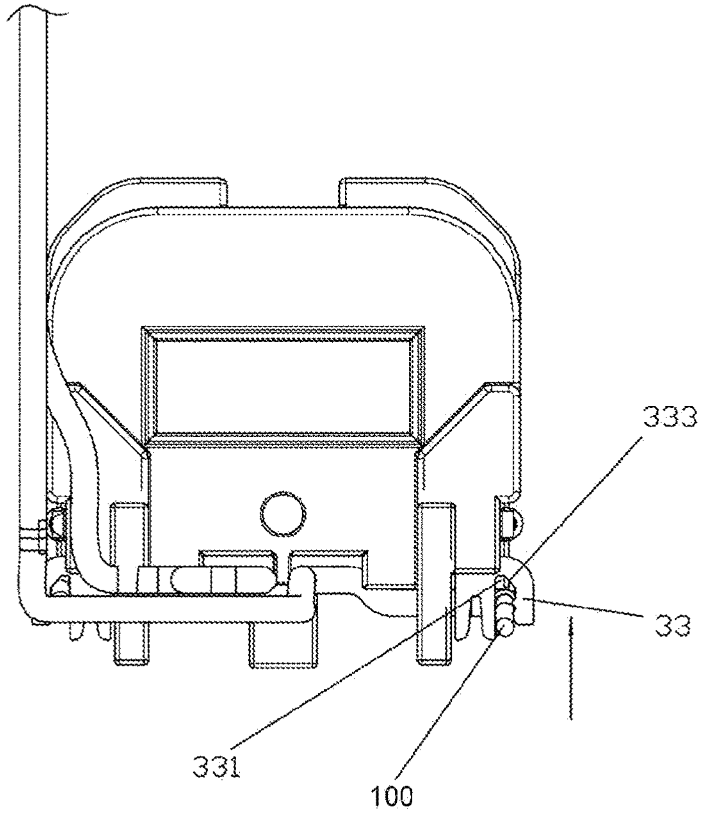
FIG. 8 is a schematic process view 1 showing that a signal wire is installed into the coil pin according to the first embodiment of the present disclosure.
Figure 9:
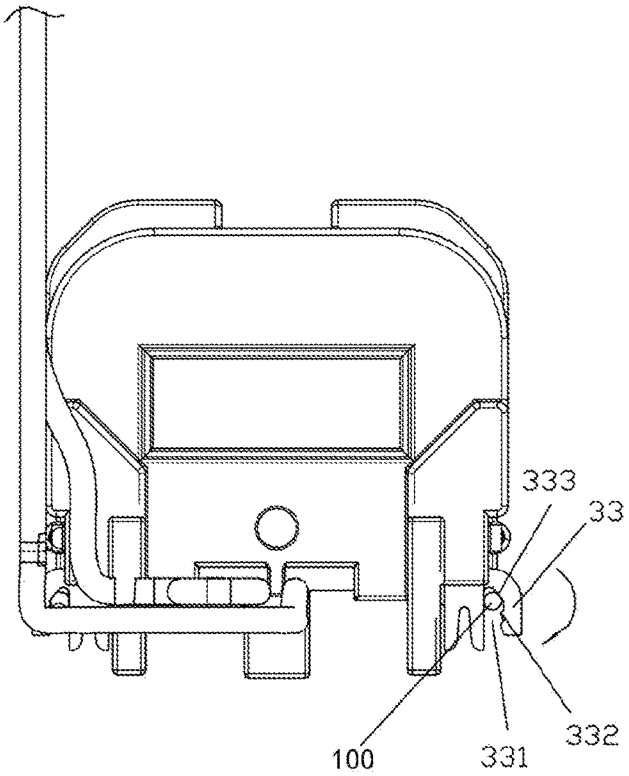
FIG. 9 is a schematic process view 2 showing that a signal wire is installed into the coil pin according to the first embodiment of the present disclosure.
Figure 10:
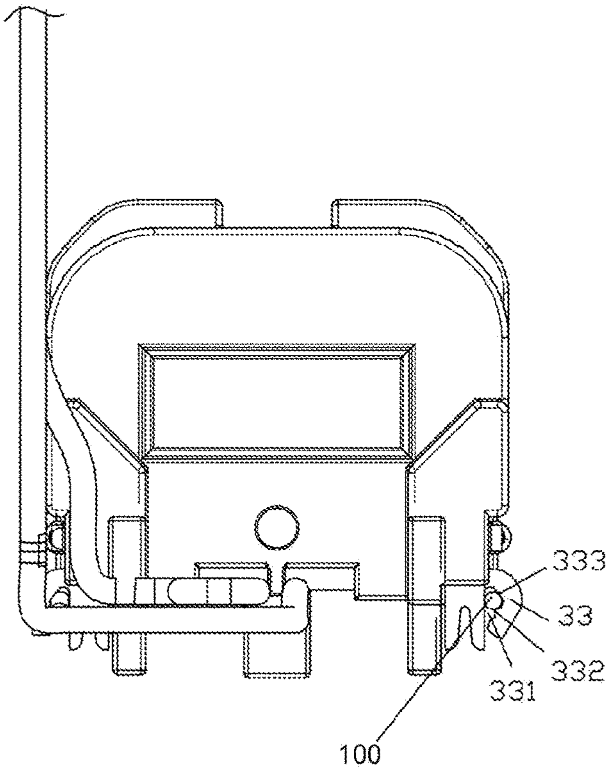
FIG. 10 is a schematic process view 3 showing that a signal wire is installed into the coil pin according to the first embodiment of the present disclosure.
Figure 11:
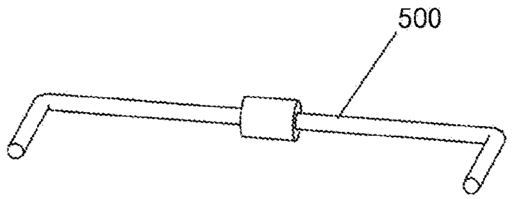
FIG. 11 is a schematic structural view of an electronic component according to the first embodiment of the present disclosure.
Figure 12:
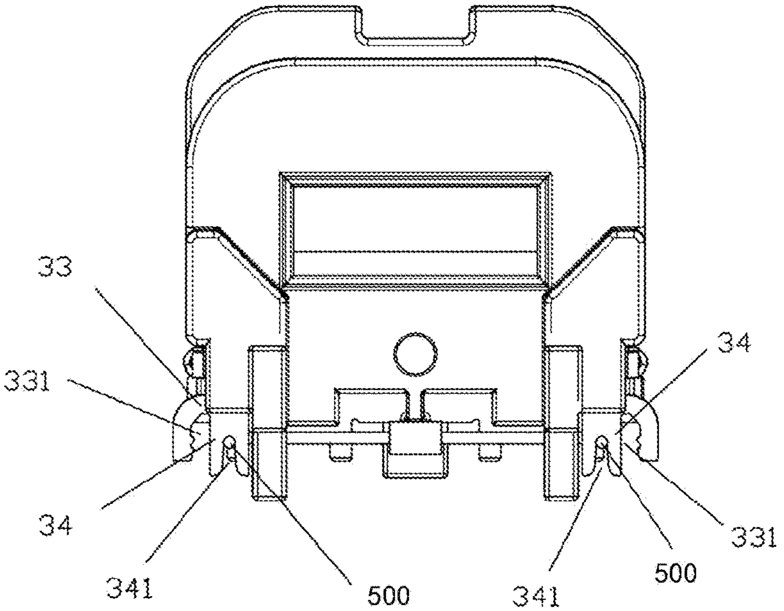
FIG. 12 is a schematic view of cooperation of the electronic component and the coil pin according to the first embodiment of the present disclosure.

Now, the exemplary implementations will be described more completely with reference to the accompanying drawings. However, the exemplary implementations can be done in various forms and should not be construed as limiting the implementations as set forth herein. Although relative terms such as "above" and "under" are used herein to describe the relationship of one component relative to another component, such terms are used herein only for the sake of convenience, for example, in the direction shown in the figure, it should be understood that if the referenced device is inversed upside down, a component described as "above" will become a component described as "under". When a structure is described as "above" another structure, it probably means that the structure is integrally formed on another structure, or, the structure is "directly" disposed on another structure, or, the structure is "indirectly" disposed on another structure through an additional structure.

Words such as "one", "an/a", "the" and "said" are used herein to indicate the presence of one or more elements/component parts/and others. Terms "including", and "having" have an inclusive meaning which means that there may be additional elements/component parts/and others in addition to the listed elements/component parts/and others. Terms "first", "second", "third" and "fourth" are used herein only as markers, and they do not limit the number of objects modified after them.

The First Embodiment of a Relay Coil Assembly

Referring to FIGS. 1 to 12, a relay coil assembly of the present disclosure includes a bobbin 1, an enameled wire 200, a coil pin 3 and a signal wire 400; flanges 11 are respectively provided on two ends of the bobbin 1, a winding window 12 of the bobbin is formed between the two flanges 11, and the enameled wire 200 is wound in the winding window 12; the coil pin 3 comprises an insertion portion 31, an enameled wire fixing portion 32, and a signal wire fixing portion 33, and the coil pin 3 is mounted to the flange on one of the ends of the bobbin 1 through the insertion portion 31; the signal wire fixing portion 33 is provided with a first engagement recess 331 with an opening facing downward; the signal wire 400 is engaged in the first engagement recess 331; an inverted hook 332 is provided near an edge of the opening and at one of two recess sidewalls of the first engagement recess 331, and a slope section 333 along which the opening gradually enlarges from inside to outside is provided at a location corresponding to the signal wire 400 at one of the two recess sidewalls of the first engagement recess 331, so that when a force is applied to outside of one of the recess sidewalls provided with the inverted hook 332, the slope section 333 is capable to squeeze the signal wire 400 into the first engagement recess 331 and the inverted hook 332 is capable to prevent the signal wire 400 from coming out of the first engagement recess 331.

In this embodiment, after the signal wire 400 is engaged in the first engagement recess 331 of the coil pin 3, the signal wire 400 is fixed to the coil pin 3 by means of welding.

In this embodiment, in the first engagement recess 331, the recess sidewall provided with the slope section 333 and the recess sidewall provided with the inverted hook 332 are on the same sidewall, and the other recess sidewall of the first engagement recess 331 is configured as a straight-surfaced wall.

In this embodiment, the inverted hooks 332 are two, and the two inverted hooks 332 are arranged in order inwardly from an edge of the opening.

Furthermore, the coil pin 3 further includes an electronic component fixing portion 34, and the electronic component 500 is a resistor or a diode; the electronic component fixing portion 34 is provided with a second engagement recess 341 having an opening facing downward, and the second engagement recess 341 is provided on a side of the first engagement recess 331.

In this embodiment, the straight-surfaced wall of the first engagement recess 331 is closer to the second engagement recess 341 than the recess sidewall of the slope section 333 of the first engagement recess 331.

In this embodiment, the coil pin 3 is a sheet-shaped structure; an iron core mounting hole 13 of a bobbin 1 has a horizontally arranged axis Z (see FIG. 6); the insertion portion 31 is provided in an upper middle portion of the coil pin 3 and fitted into a fitting recess 14 of the flange 11 on one of ends of the bobbin 1; the signal wire fixing portion 33 and the electronic component fixing portion 34 are provided on a lower part of the coil pin 3; a middle part of the coil pin 3 extends to one side to form the enameled wire fixing portion 32 which is bent to the winding window 12 of the bobbin 1 after the coil pin 3 is mounted to the bobbin 1.

In this embodiment, the enameled wire fixing portion 32 of the coil pin 3 is further provided with a first tooth-shaped structure 321 for positioning and winding the enameled wire.

In this embodiment, the insertion portion 31 of the coil pin 3 is further provided with a second tooth-shaped structure 311 for realizing an interference fit with the fitting recess of the bobbin 1.

Compared with the prior art, the present disclosure has beneficial effects:

As for the relay coil assembly according to the present disclosure, an inverted hook 332 is provided near an edge of the opening and at one of two recess sidewalls of the first engagement recess 331, and a slope section 333 along which the opening gradually enlarges from inside to outside is provided at a location corresponding to the signal wire 400 at one of the two recess sidewalls of the first engagement recess 331, so that when a force is applied to outside of one of the recess sidewalls provided with the inverted hook 332, the slope section is capable to squeeze the signal wire 400 into the first engagement recess 331 and the inverted hook 332 is capable to prevent the signal wire 400 from coming out. Due to the structure of the present disclosure, with the slope provided within the first engagement recess 331, corresponding to forming a triangular area, after the flexible signal wire 400 is pressed into the first engagement recess 331 from the opening of the first engagement recess 331 along the edge of the inverted hook 332, by squeezing the outside of one of the recess sidewalls of the first engagement recess 331 with the inverted hook 332, the inverted hook 332 of the recess sidewall is deformed toward the other recess sidewall, so that a space in the recess becomes smaller, and the signal wire 400 is in an interference fit with the first engagement recess 331, so that the signal wire 400 is stuck and thereby not easy to fall off.

As for the relay coil assembly according to the present disclosure, after the signal wire 400 is engaged in the first engagement recess 331 of the coil pin 3, the signal wire 400 is fixed with the coil pin 3 by means of welding. The structure of the present disclosure forms a double insurance of engaging and welding, without having virtual welding happened, so that the connection between the signal wire 400 and the coil pin 3 is more reliable.

As for the relay coil assembly according to the present disclosure, the enameled wire fixing portion 32 of the coil pin 3 is also provided with a first tooth-shaped structure 321 which is convenient for positioning and winding the enameled wire 200. This structure of the present disclosure controls a starting position of a first loop of the enameled wire 200 by means of the first tooth-shaped structure 321 so as to avoid the overlapping of the enameled wire 200 and the bobbin 1 and prevent the enameled wire 200 from being stuck when the enameled wire 200 is wound and then bent.

The Second Embodiment of the Relay Coil Assembly

Figure 13:
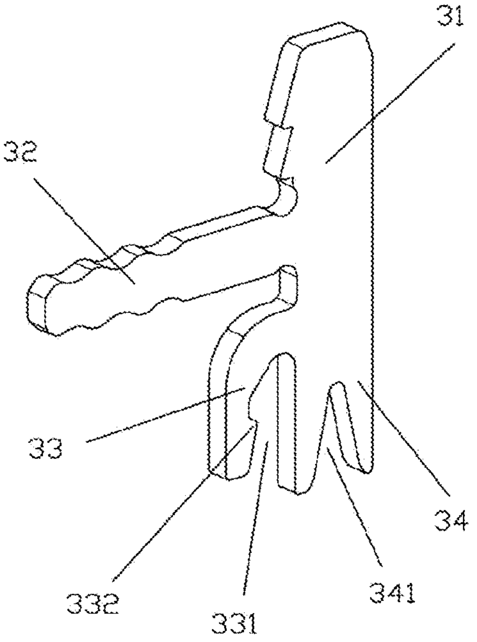
FIG. 13 is a schematic perspective view of a coil pin of a second embodiment of a relay coil assembly according to the present disclosure.
Figure 14:
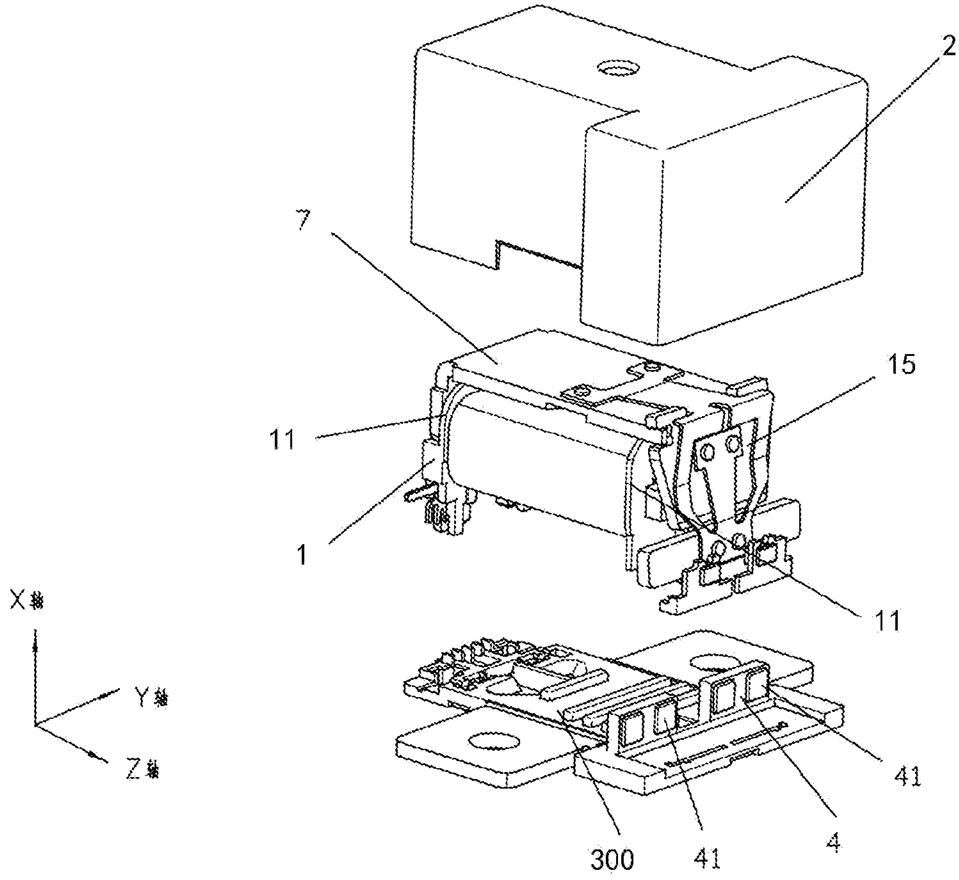
FIG. 14 is an exploded schematic perspective view of an embodiment of the high-current relay with adjustable overtravel according to the present disclosure.
Figure 15:
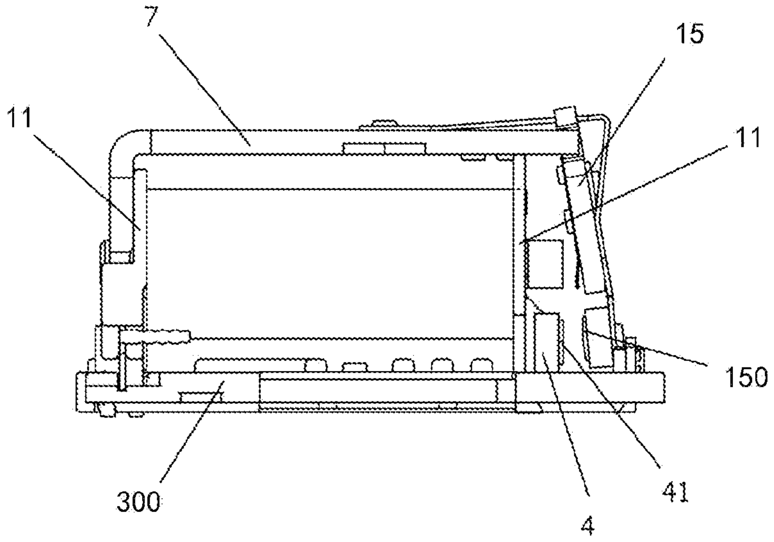
FIG. 15 is a front view (without housing) according to an embodiment of the present disclosure.
Figure 16:
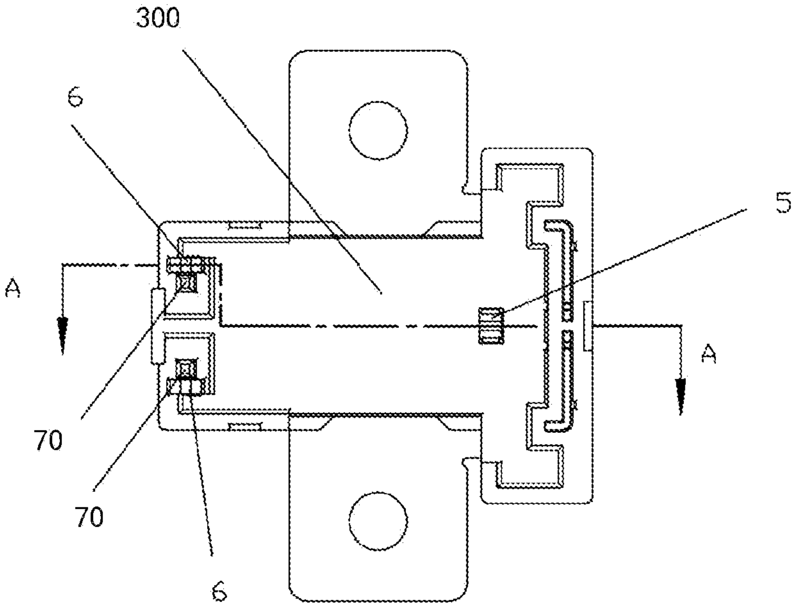
FIG. 16 is a bottom view (without housing) according to an embodiment of the present disclosure.
Figure 17:
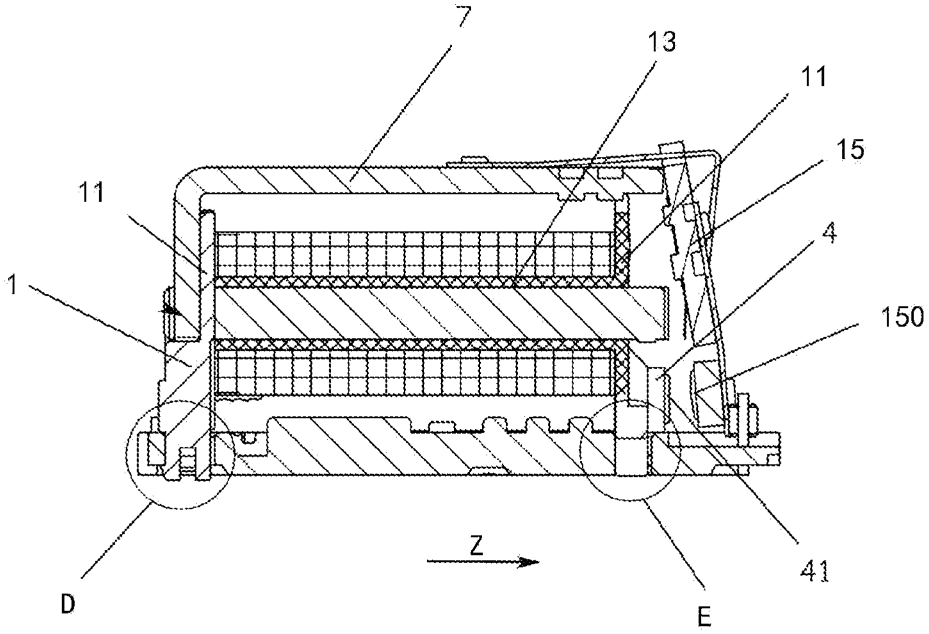
FIG. 17 is a cross-sectional view taken along line A-A in FIG. 16.
Figure 18:
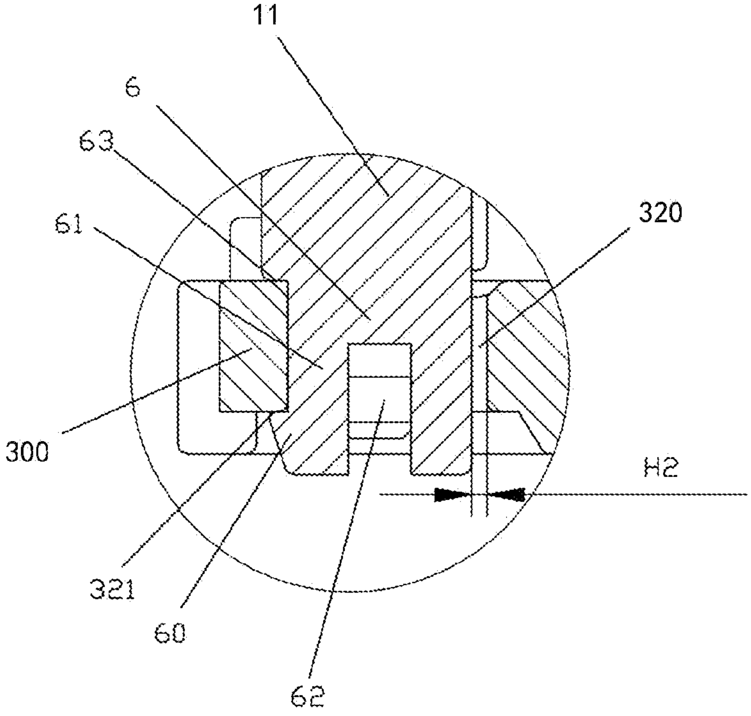
FIG. 18 is an enlarged schematic view of part D in FIG. 17.

Referring to FIG. 13, the relay coil assembly of the present disclosure has difference from that of the first embodiment in that there is only one inverted hook 332.

The Embodiment of the High-Current Relay with an Adjustable Over-Travel

Figure 19:
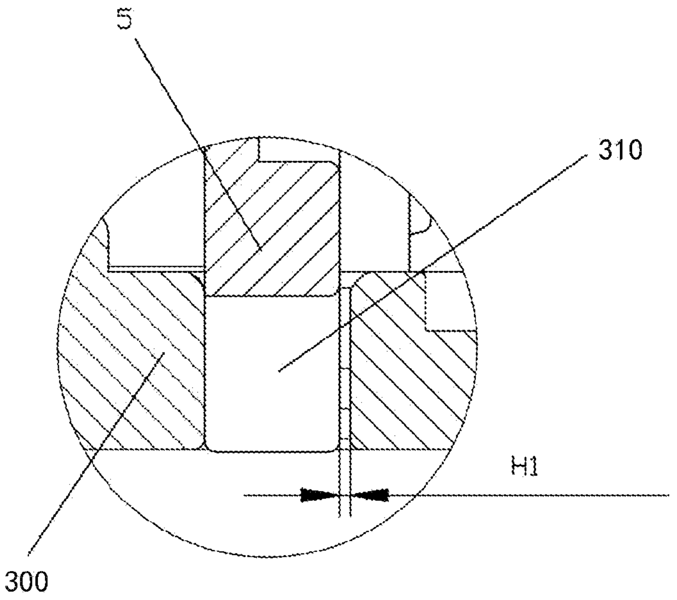
FIG. 19 is an enlarged schematic view of part E in FIG. 17.
Figure 20:
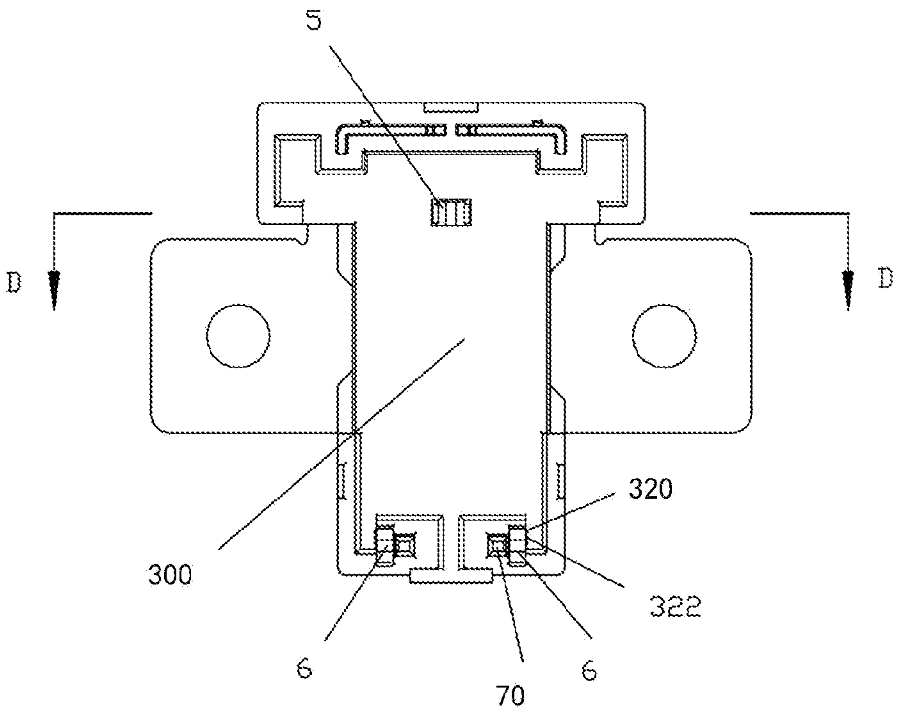
FIG. 20 is a bottom view (without housing and rotated at an angle) according to an embodiment of the present disclosure.

Referring to FIGS. 14-27, the high-current relay with an adjustable over-travel accordingly to the present disclosure includes a housing 2, a bobbin 1, a moving spring armature 15 and a base 300. An axis of an iron core mounting hole 13 of the bobbin 1 is horizontally arranged, the iron core mounting hole 13 is provided with an iron core, and flanges 11 are respectively provided on both ends of the bobbin 1, and a winding window is formed between the two flanges 11 and wound around an enameled wire. The moving spring armature 15 is installed together with the bobbin 1 such that the movable contacts 150 of the moving spring armature 15 is in a matting state with the fixed contacts 41 on the outside of one end of the bobbin 1, and the fixed contacts 41 are provided on the fixed contact piece 4 that is mounted on the base 300. The flange at one end of the bobbin 1 extends downwardly and is provided with a first hook member 5 (see FIGS. 19-21), and a first engagement hole 310 is provided at the corresponding position of the base 300. The first hook member 5 of the bobbin 1 is fitted into the first engagement hole 310 of the base 300 such that an integral part including the bobbin 1 and the moving spring armature 15 is restricted along a vertical direction and a horizontal direction perpendicular to the axis of the iron core mounting hole 13 at a location corresponding to the first engagement hole 310, in which the integral part further includes the yoke, the iron core and the enameled wire, and there is a movable first gap H1 along the axis of the iron core mounting hole 13. By taking the axis of the iron core as Z axis, a vertical direction as X axis, and a horizontal direction perpendicular to the axis of the iron core mounting hole as Y axis, the first hook member 5 of the bobbin is matched with the first engagement hole 310 of the base 300 at the location corresponding to the first engagement hole, the integral part is not movable along forward and backward directions of the X axis with respect to the base 300, but along Z axis, the integral part may be movable by a distance of the first gap H1 with respect to the base 300. The flange at the other end of the bobbin 1 extends downwardly and is provided with a second hook member 6, and a second engagement hole is provided at the corresponding position of the base 300, and the second hook member 6 of the bobbin 1 is fitted in the second engagement hole 320 of the base 300 such that the integral part is restricted along the vertical direction and the horizontal direction perpendicular to the axis of the iron core mounting hole 13 at a location corresponding to the second engagement hole 320, and there is movable second gap H2 along the axis of the iron core mounting hole 13, in this way, the second hook member 6 of the bobbin 1 is matched with the second engagement hole 320 of the base 300, the integral part is not movable along forward and backward directions of X axis with respect to the base 300, and the integral part is not movable along forward and backward direction of Y axis with respect to the base 300, but along Z axis, the integral part may be movable by a distance of the second gap with respect to the base 300, so that the over-travel adjustment of the contacts can be achieved by use of the first gap H1 and the second gap H2, and the first gap H1 is equal to the second gap H2.

In this embodiment, the first hook member 5 is one, and is arranged directly below the axis Z of the iron core mounting hole 13. The second hook members 6 are two, and are symmetrically arranged on the two sides directly below the axis Z of the iron core mounting hole 13.

Figure 21:
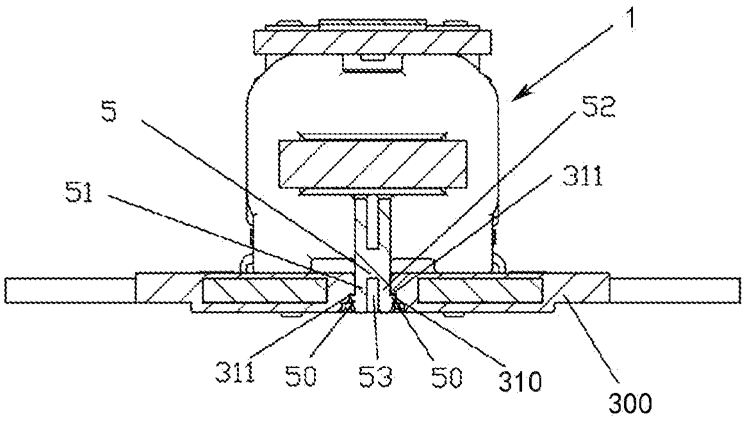
FIG. 21 is a sectional view taken along line D-D in FIG. 20.
Figure 22:
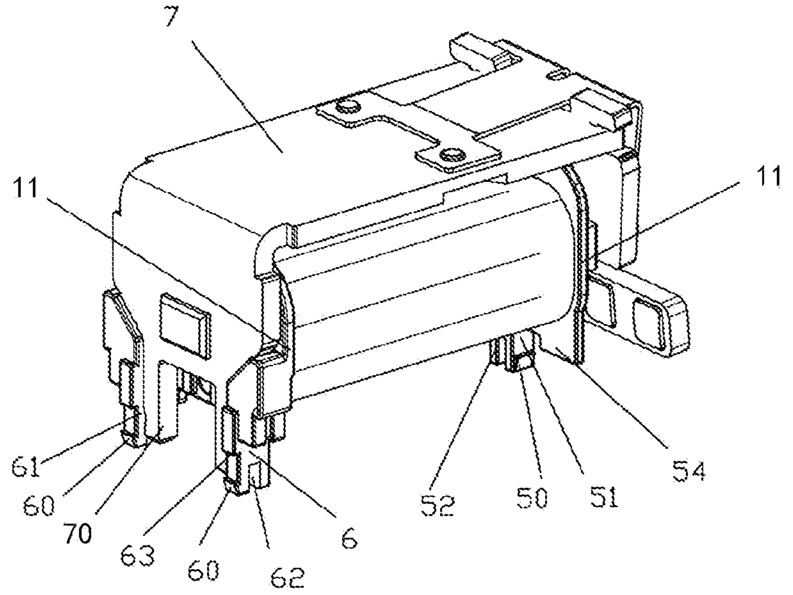
FIG. 22 is a schematic view of the cooperation of a bobbin, a moving spring armature and a yoke according to an embodiment of the present disclosure.
Figure 23:
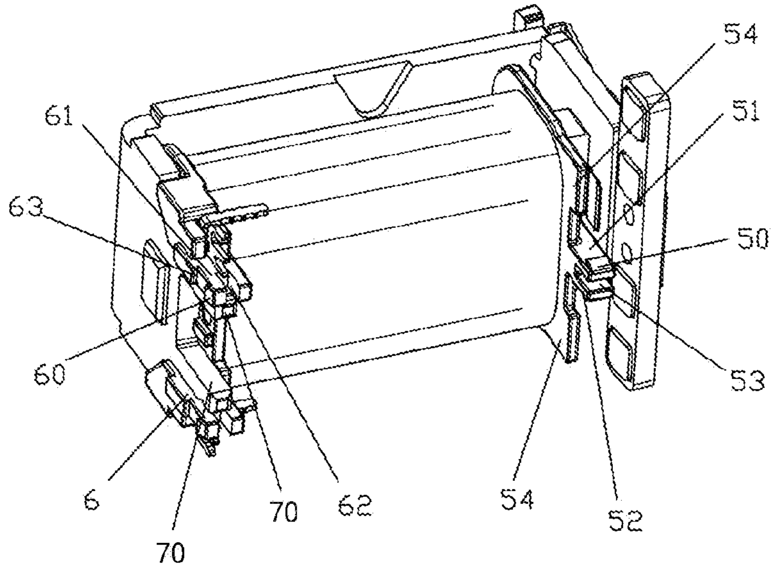
FIG. 23 is a schematic view of the cooperation of a bobbin, a moving spring armature and a yoke (flip by an angle) according to an embodiment of the present disclosure.
Figure 24:
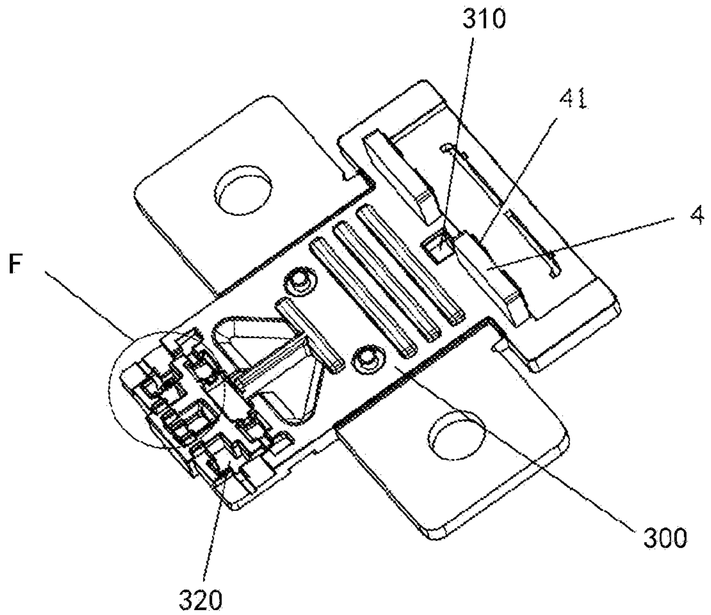
FIG. 24 is a schematic view of the cooperation of a base and a fixed contact piece according to an embodiment of the present disclosure.
Figure 25:
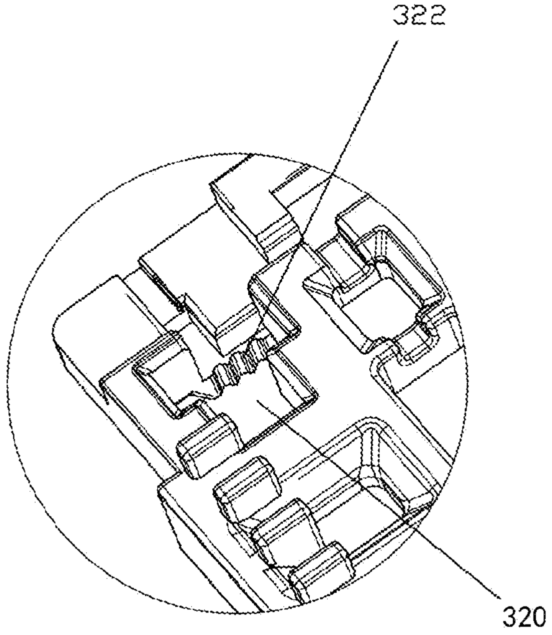
FIG. 25 is an enlarged schematic view of part F in FIG. 24.
Figure 26:
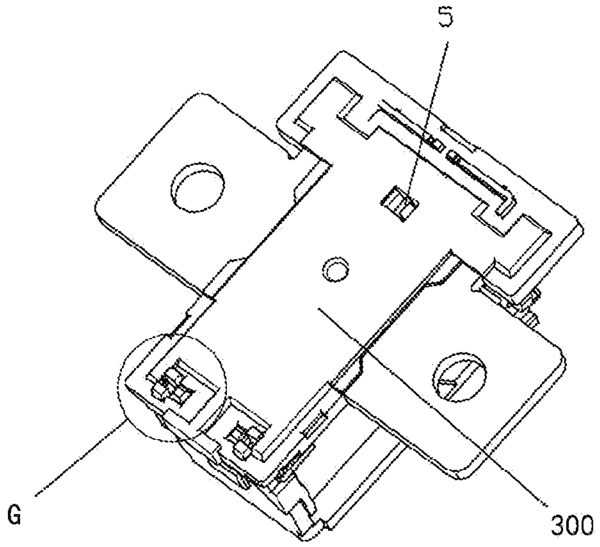
FIG. 26 is a schematic perspective view (without housing and flip by bottom) according to an embodiment of the present disclosure.
Figure 27:
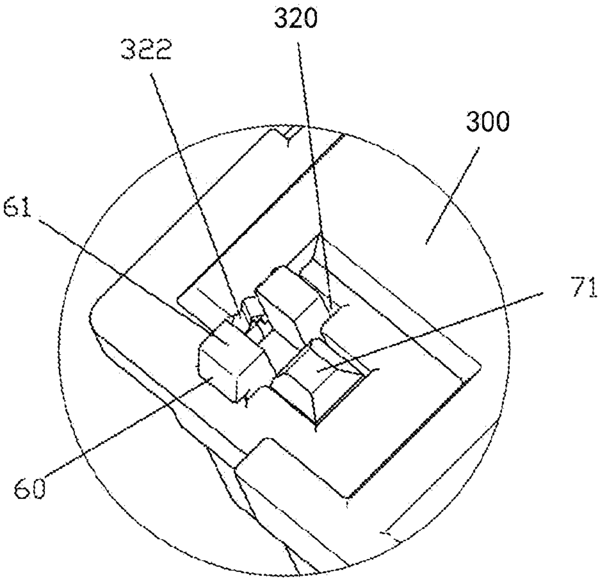
FIG. 27 is an enlarged schematic view of part G in FIG. 26.
Figure 28:
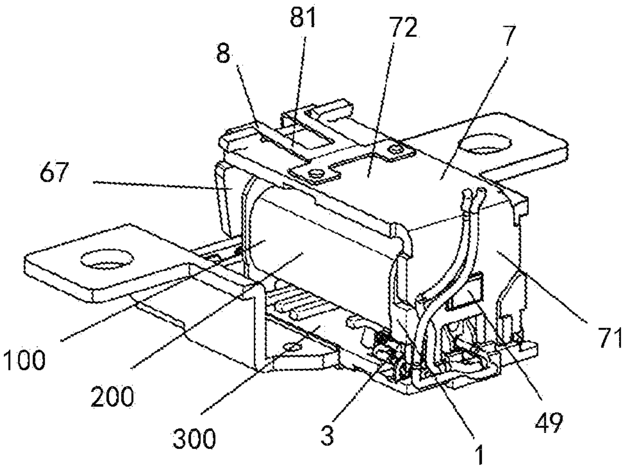
FIG. 28 is a schematic perspective view of a first embodiment of the relay (without housing) that ensures normal operation of an armature or a moving spring according to the present disclosure.
Figure 29:
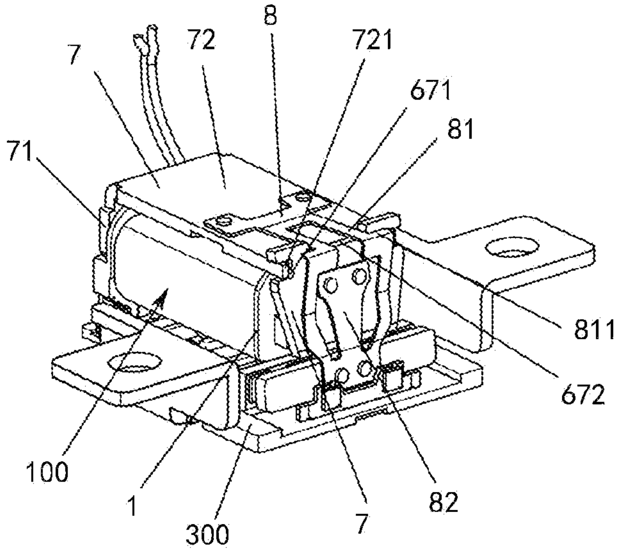
FIG. 29 is a schematic perspective view (without housing but rotated by an angle) according to an embodiment of the present disclosure.
Figure 30:
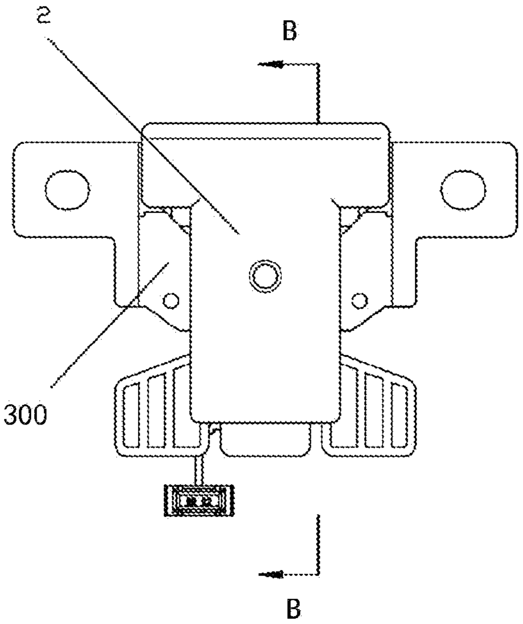
FIG. 30 is a top view of the first embodiment of the present disclosure.
Figure 31:
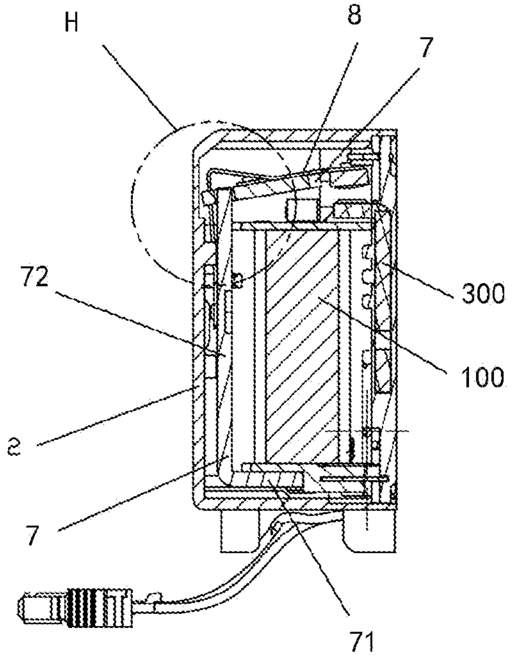
FIG. 31 is a sectional view taken along line B-B in FIG. 30.
Figure 32:
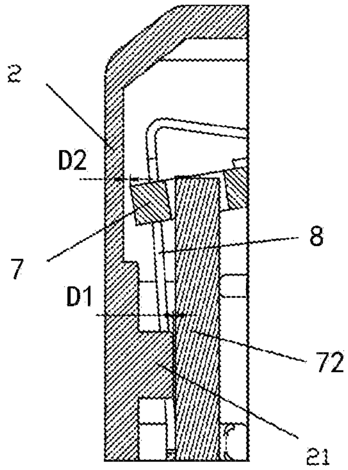
FIG. 32 is an enlarged schematic view of a partial structure in which a protrusion of the housing is not in contact with the yoke of part H in FIG. 31.
Figure 33:
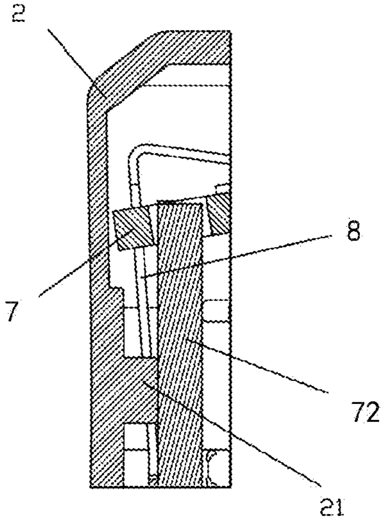
FIG. 33 is an enlarged schematic view of a partial structure in which a protrusion of the housing is in contact with the yoke of part H in FIG. 31.
Figure 34:
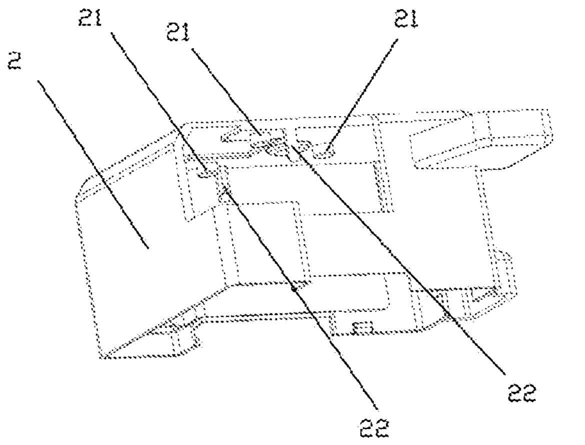
FIG. 34 is a schematic perspective view of the housing according to the first embodiment of the present disclosure.
Figure 35:
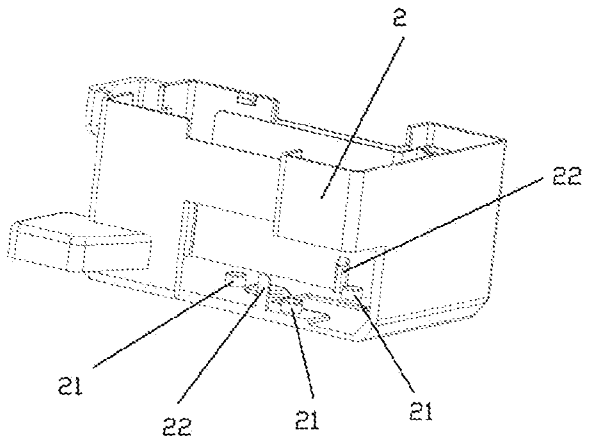
FIG. 35 is a schematic perspective view of the housing in an inverted state according to the first embodiment of the present disclosure.
Figure 36:
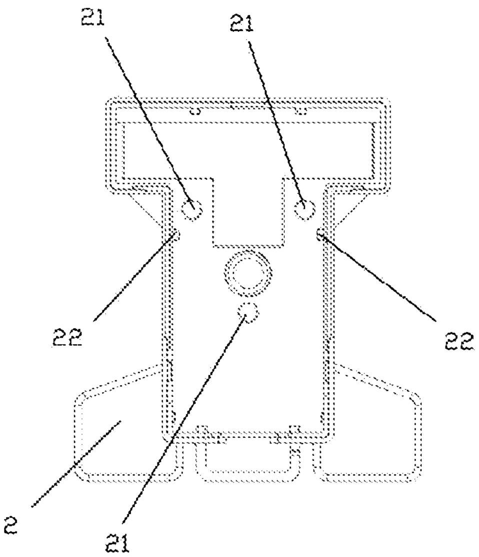
FIG. 36 is a bottom view of the housing according to the first embodiment of the present disclosure.
Figure 37:
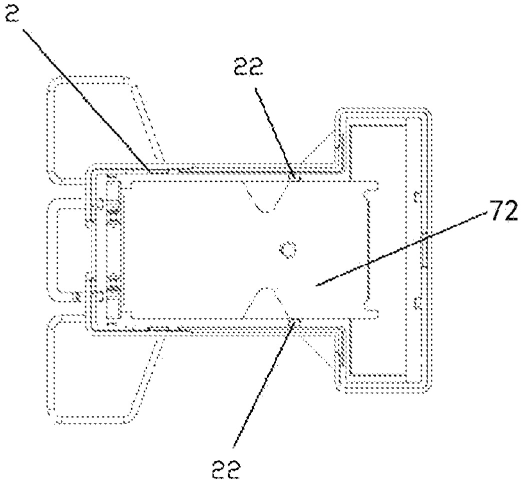
FIG. 37 is a schematic view showing a state that the housing is matched with the yoke according to the first embodiment of the present disclosure.
Figure 38:
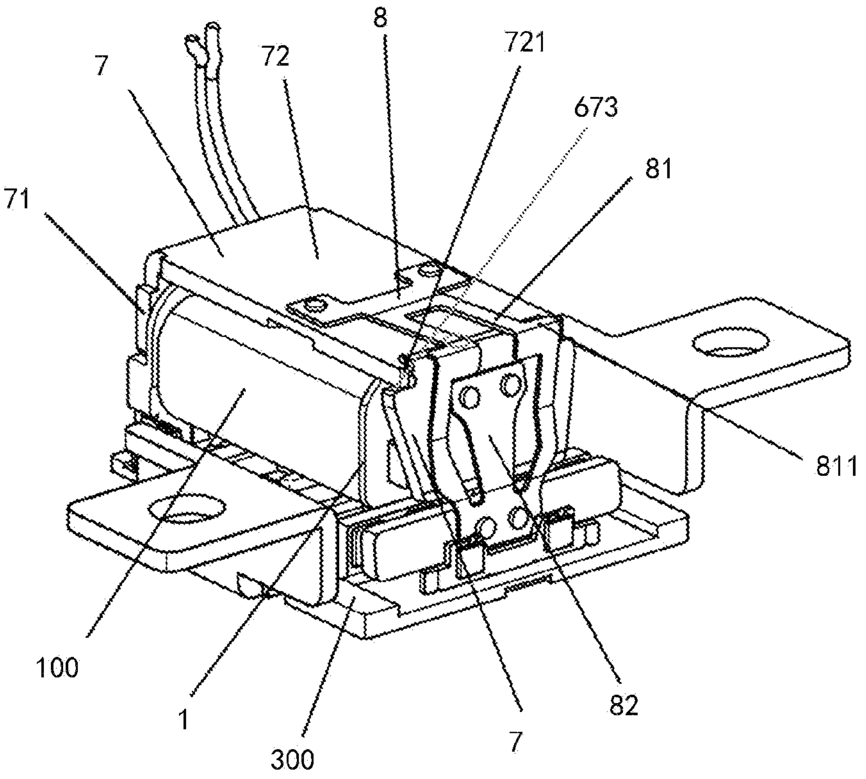
FIG. 38 is a schematic perspective view (without housing) according to a second embodiment of the present disclosure.
Figure 39:
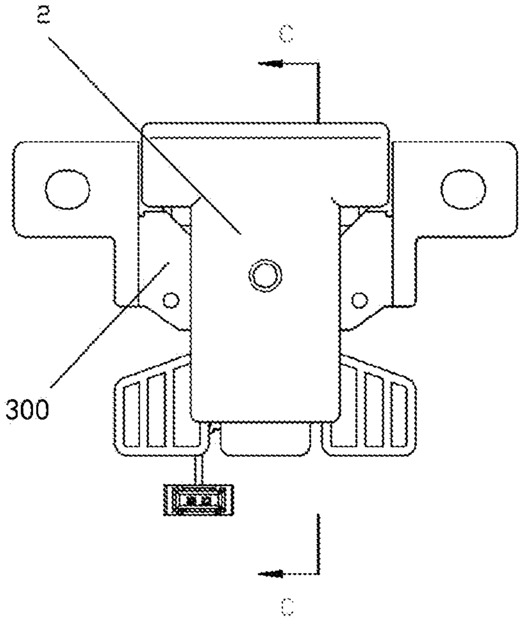
FIG. 39 is a top view of the second embodiment of the present disclosure.
Figure 40:
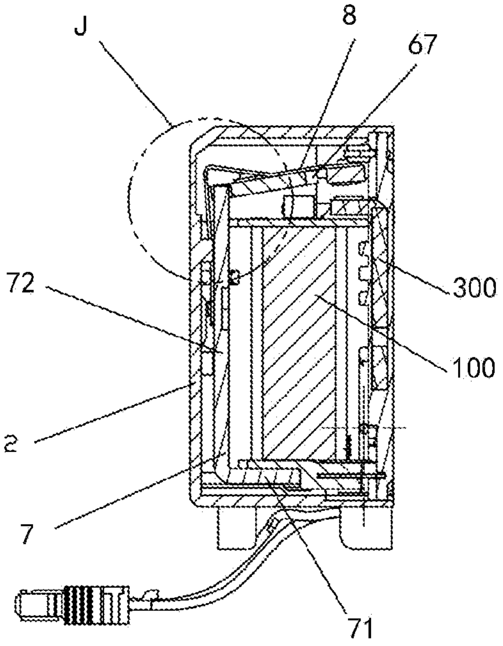
FIG. 40 is a cross-sectional view taken along line C-C in FIG. 39.
Figure 41:
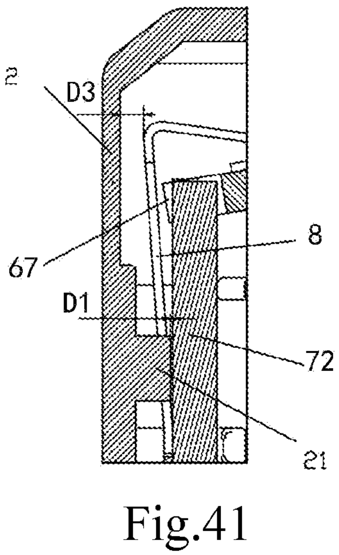
FIG. 41 is an enlarged schematic view of a partial structure in which the protrusion of the housing is not in contact with the yoke of part J in FIG. 40.
Figure 42:
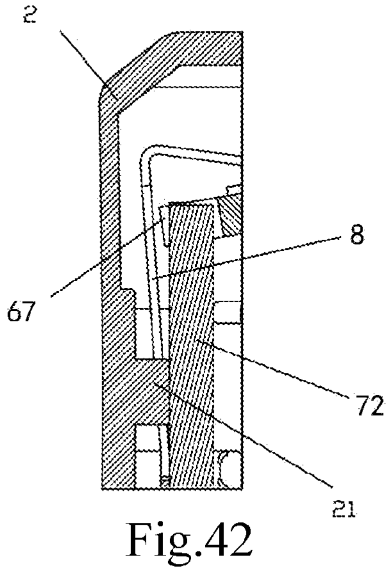
FIG. 42 is an enlarged schematic view of a partial structure in which the protrusion of the housing is in contact with the yoke of part J in FIG. 40.
Figure 43:
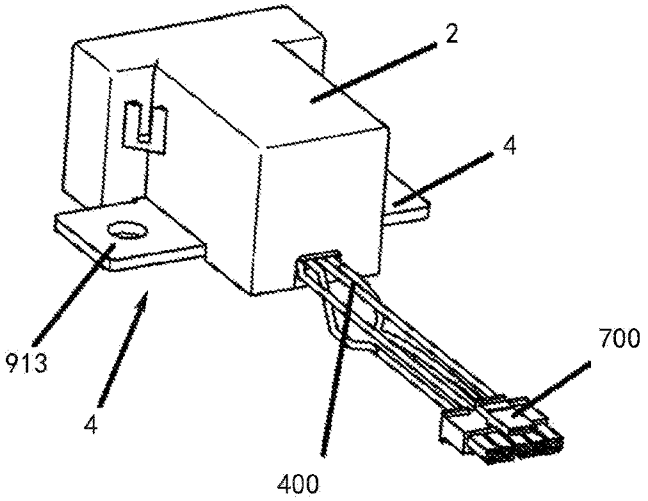
FIG. 43 is a schematic perspective view of the first embodiment of a high-current relay with signal monitoring on load terminals according to the present disclosure.
Figure 44:
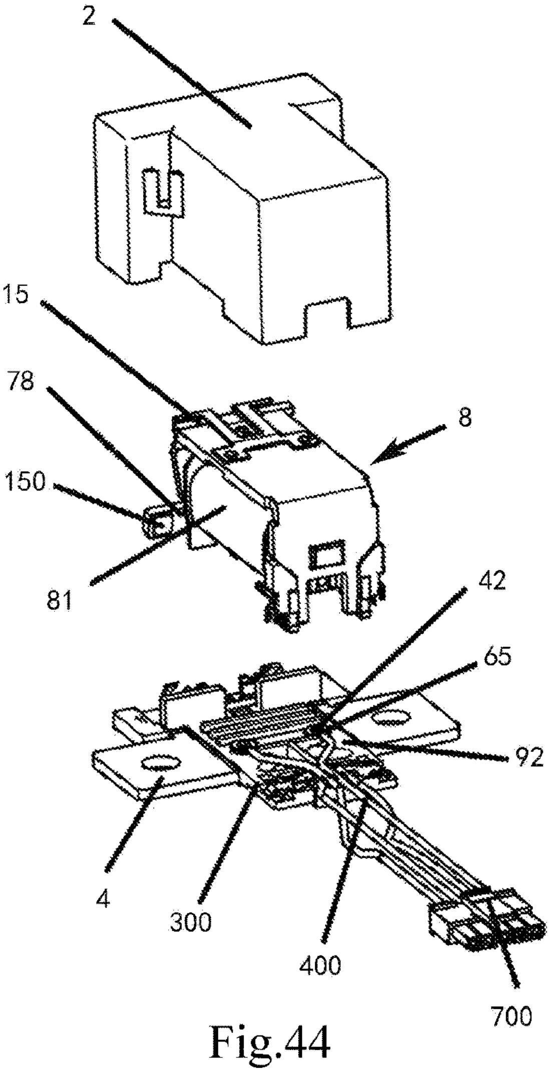
FIG. 44 is an exploded schematic perspective view of the first embodiment of the present disclosure.
Figure 45:
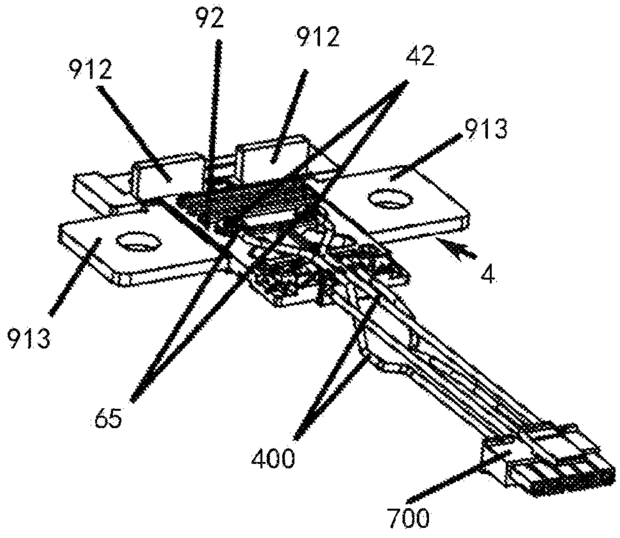
FIG. 45 is a schematic perspective view of a base according to the first embodiment of the present disclosure.
Figure 46:
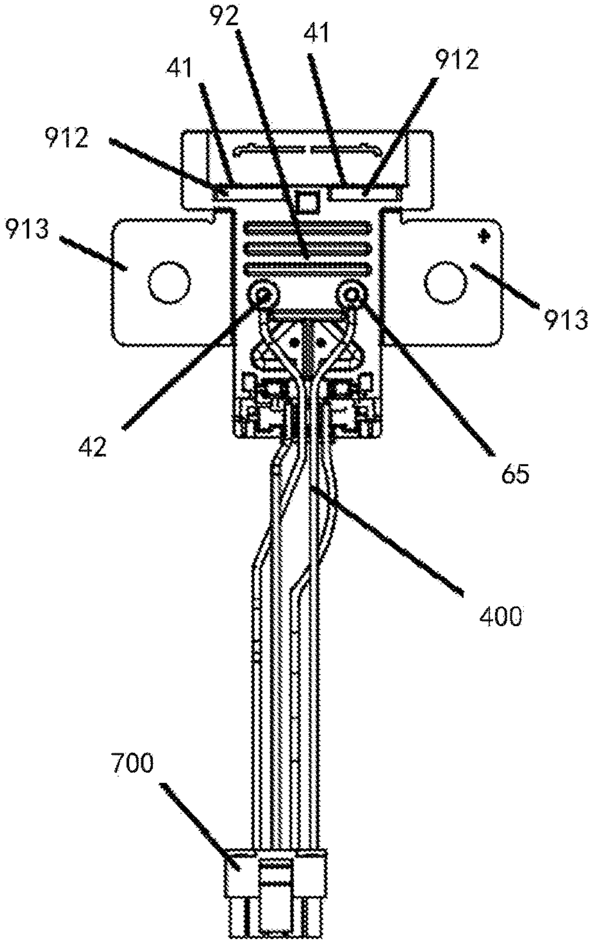
FIG. 46 is a top view of the base according to the first embodiment of the present disclosure.
Figure 47:
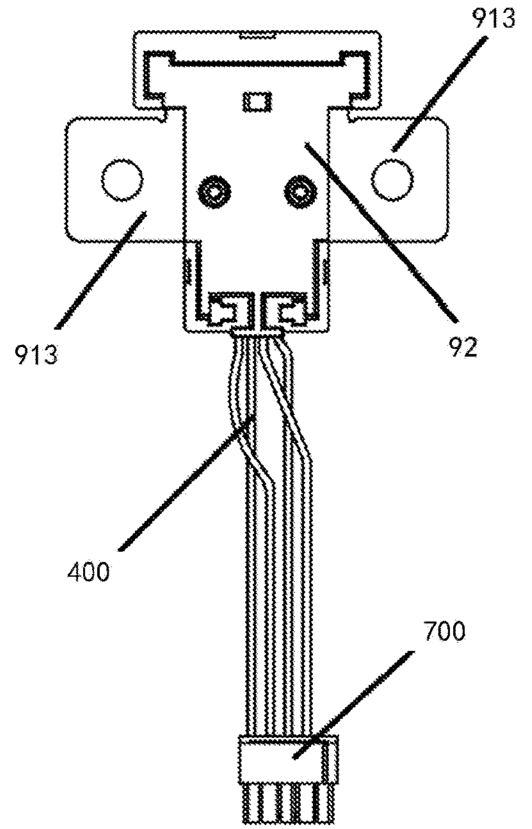
FIG. 47 is a schematic view of a flip side of the base according to the first embodiment of the present disclosure.
Figure 48:
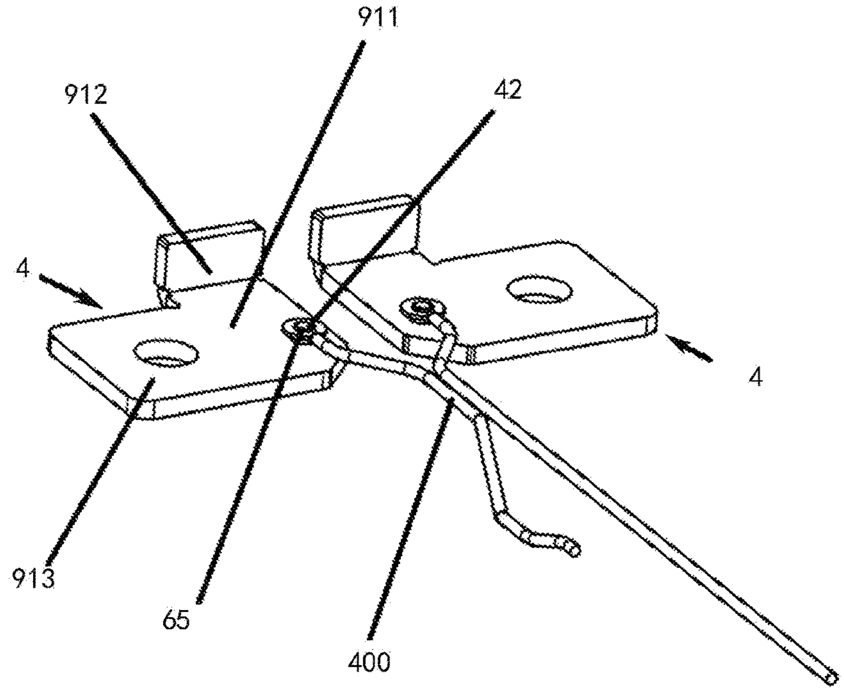
FIG. 48 is a schematic view of the cooperation of a fixed contact piece and the single wire according to the first embodiment of the present disclosure.
Figure 49:
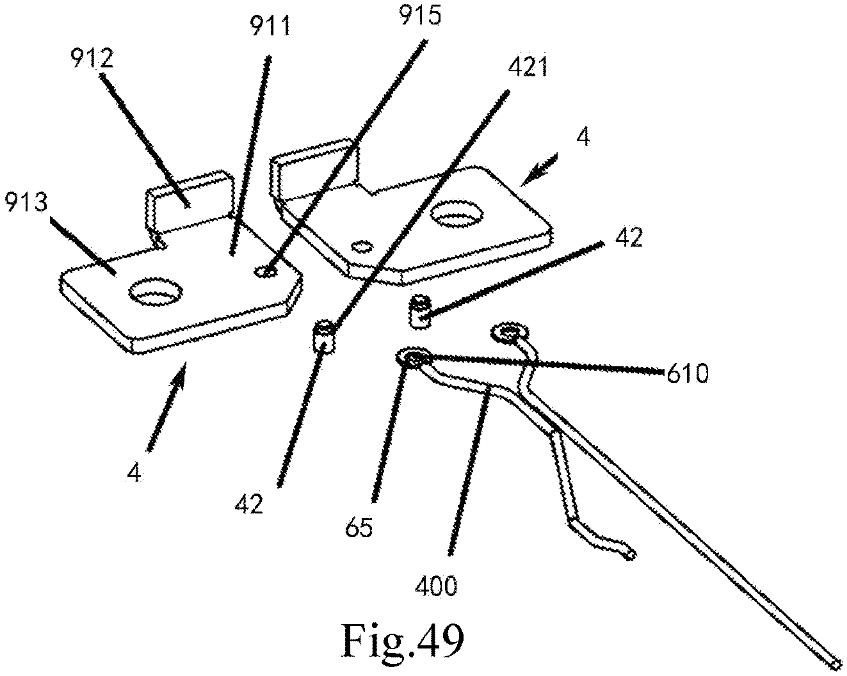
FIG. 49 is an exploded schematic view of the cooperation of the fixed contact piece and the signal wire according to the first embodiment of the present disclosure.
Figure 50:
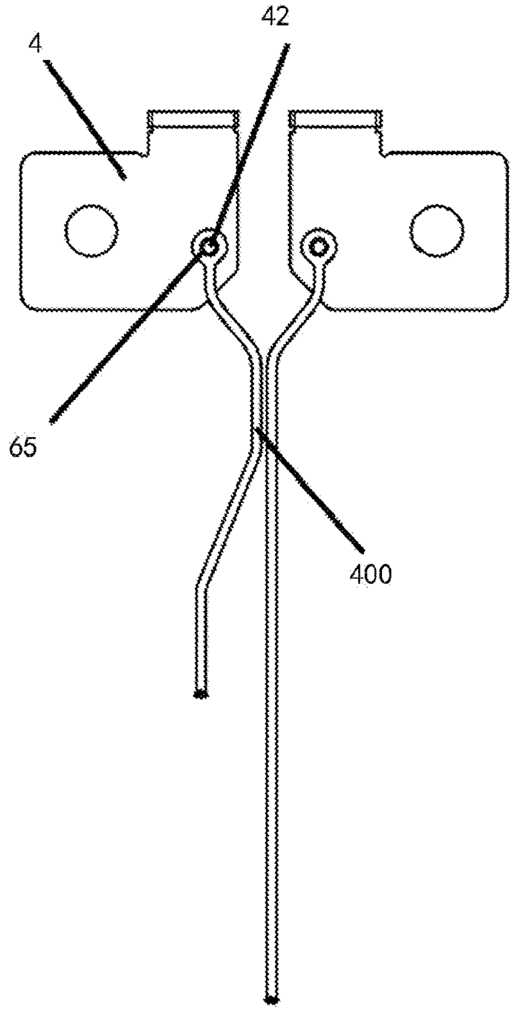
FIG. 50 is a top view of the cooperation of the fixed contact piece and the signal wire according to the first embodiment of the present disclosure.
Figure 51:
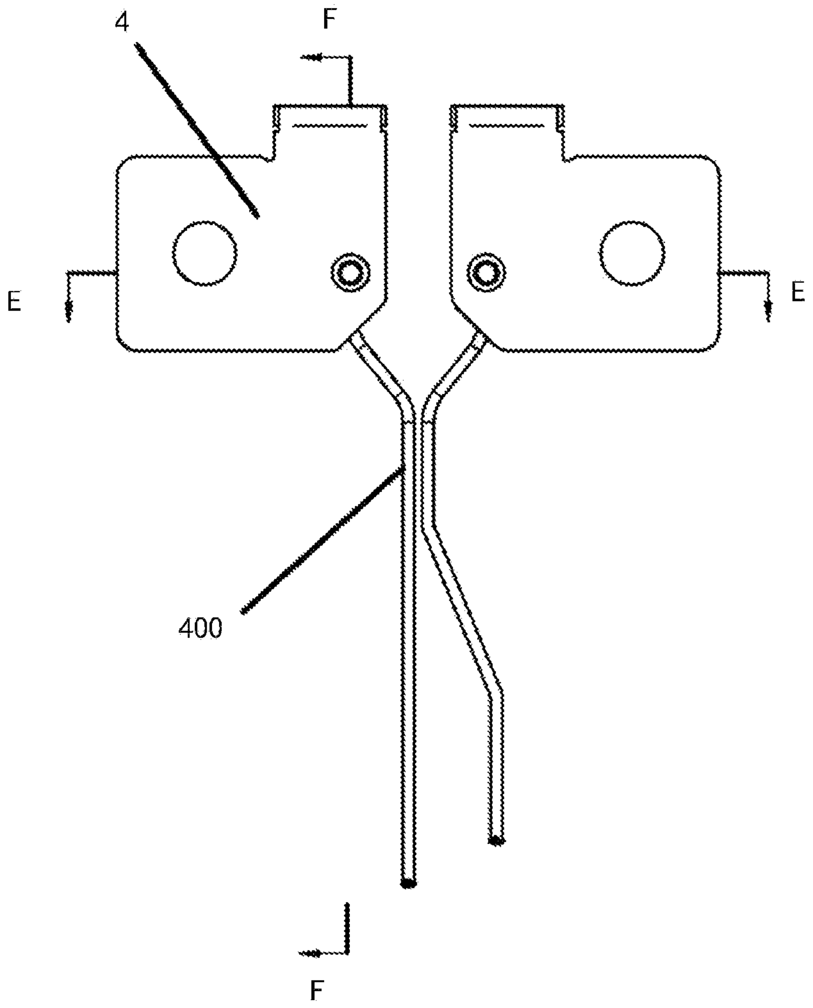
FIG. 51 is a schematic view of the flip side of the fixed contact piece cooperated with the signal wire according to the first embodiment of the present disclosure.
Figure 52:
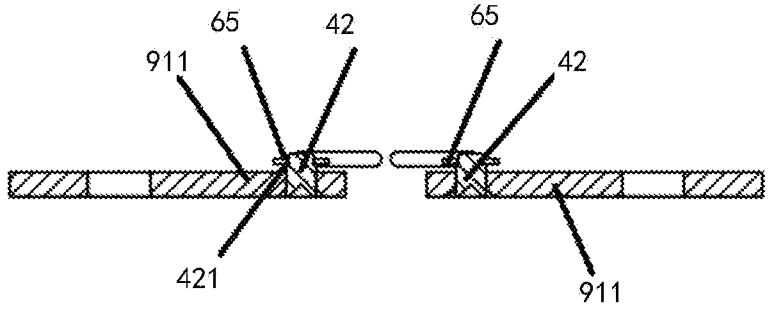
FIG. 52 is a cross-sectional view taken along line E-E in FIG. 51.
Figure 53:
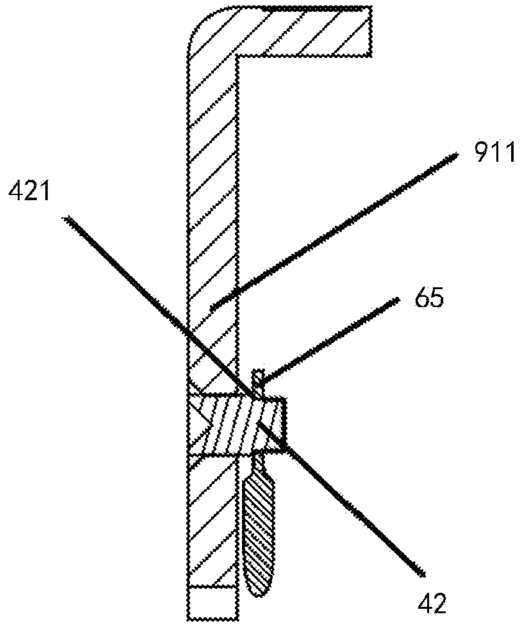
FIG. 53 is a sectional view taken along line F-F in FIG. 51 before riveting.
Figure 54:
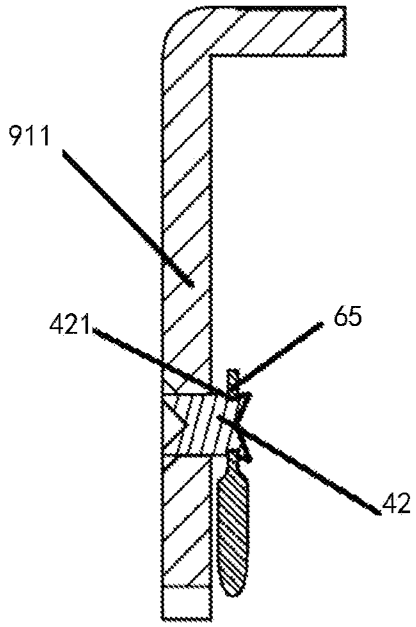
FIG. 54 is a sectional view taken along line F-F in FIG. 51 after riveting.
Figure 55:
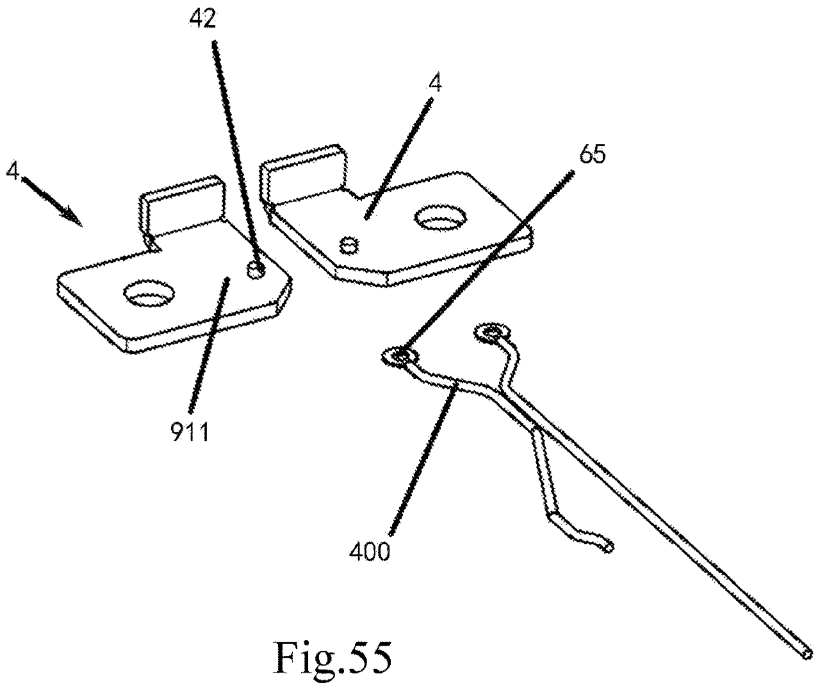
FIG. 55 is an exploded schematic view of the cooperation of the fixed contact piece and the signal wire according to the second embodiment of the present disclosure.
Figure 56:
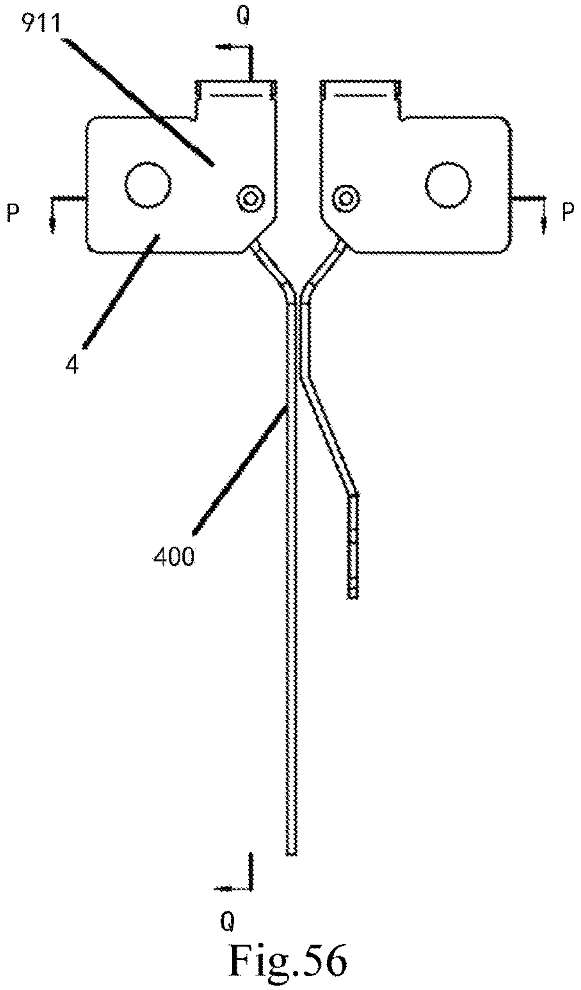
FIG. 56 is a schematic view of the flip side of the fixed contact piece cooperated with the signal wire according to the second embodiment of the present disclosure.
Figure 57:
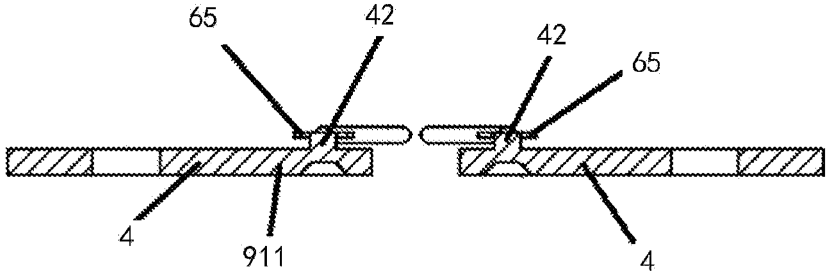
FIG. 57 is a sectional view taken along line P-P in FIG. 56.
Figure 58:
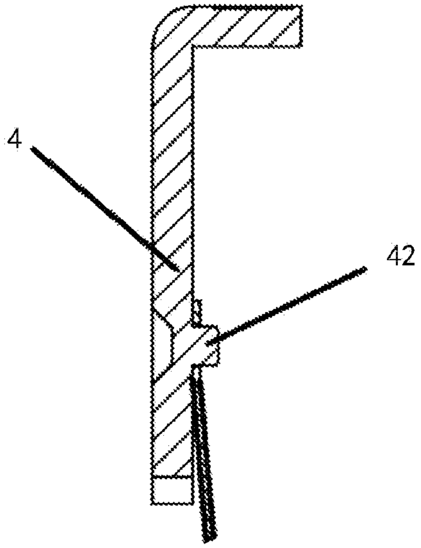
FIG. 58 is a sectional view taken along line Q-Q in FIG. 56.
Figure 59:
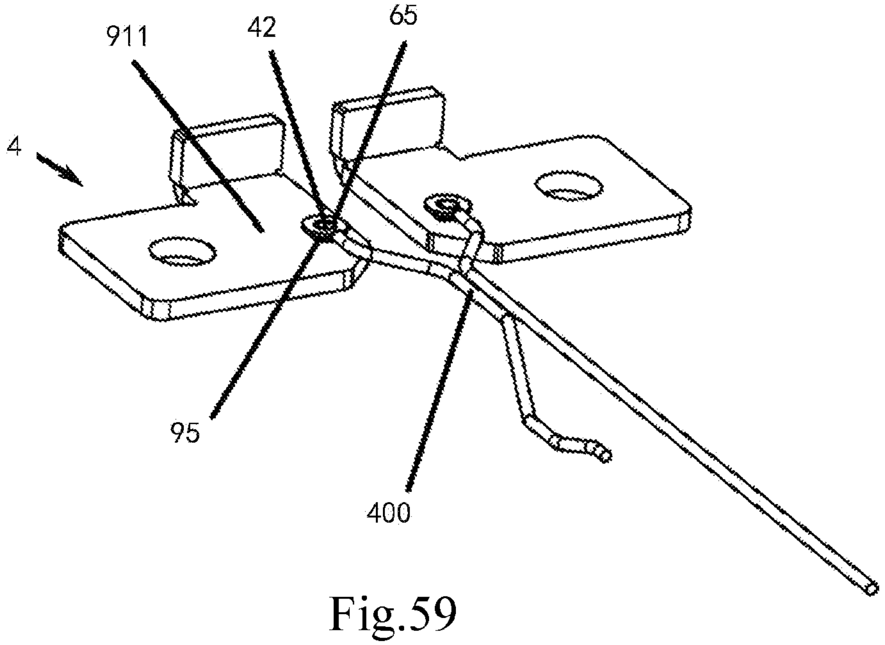
FIG. 59 is a schematic view of the cooperation of the fixed contact piece and the signal wire according to a third embodiment of the present disclosure.
Figure 60:
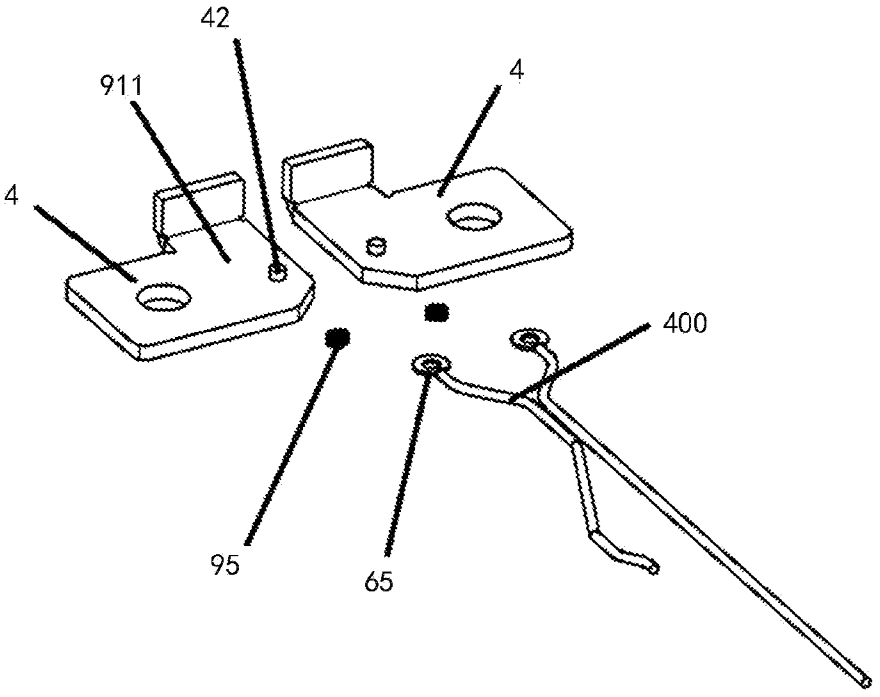
FIG. 60 is an exploded schematic view of the cooperation of the fixed contact piece and the signal wire according to the third embodiment of the present disclosure.
Figure 61:
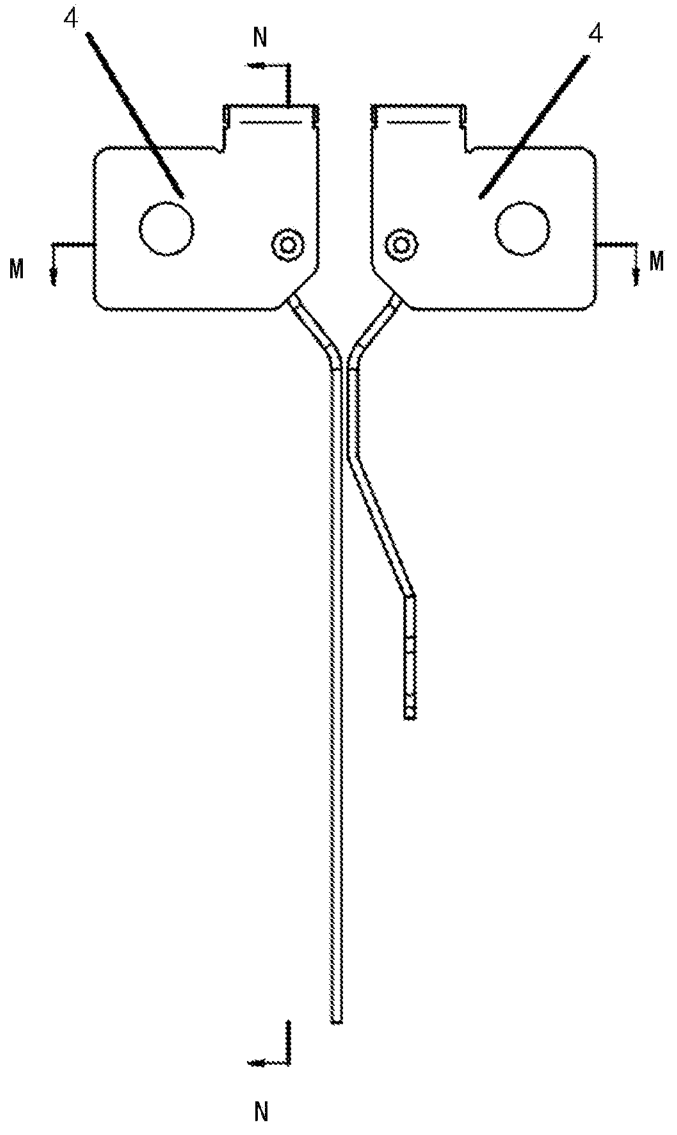
FIG. 61 is a schematic view of the flip side of the fixed contact piece cooperated with signal wire according to the third embodiment of the present disclosure.
Figure 62:
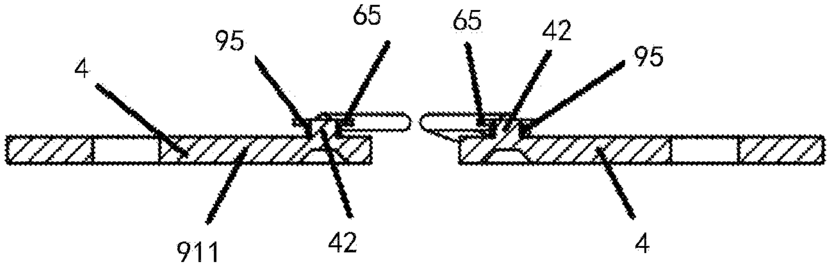
FIG. 62 is a sectional view taken along line M-M in FIG. 61.
Figure 63:
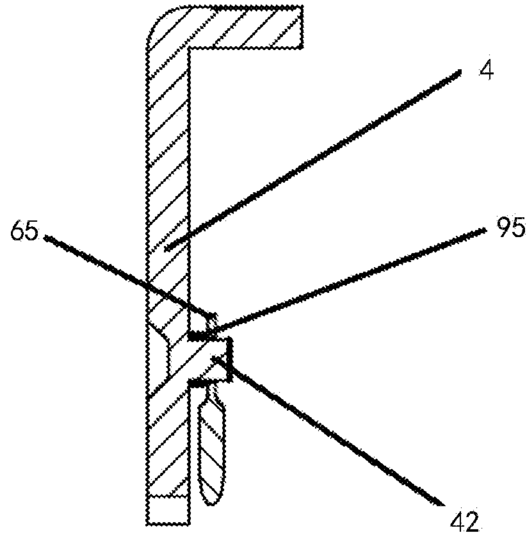
FIG. 63 is a sectional view taken along line N-N in FIG. 61.
Figure 64:
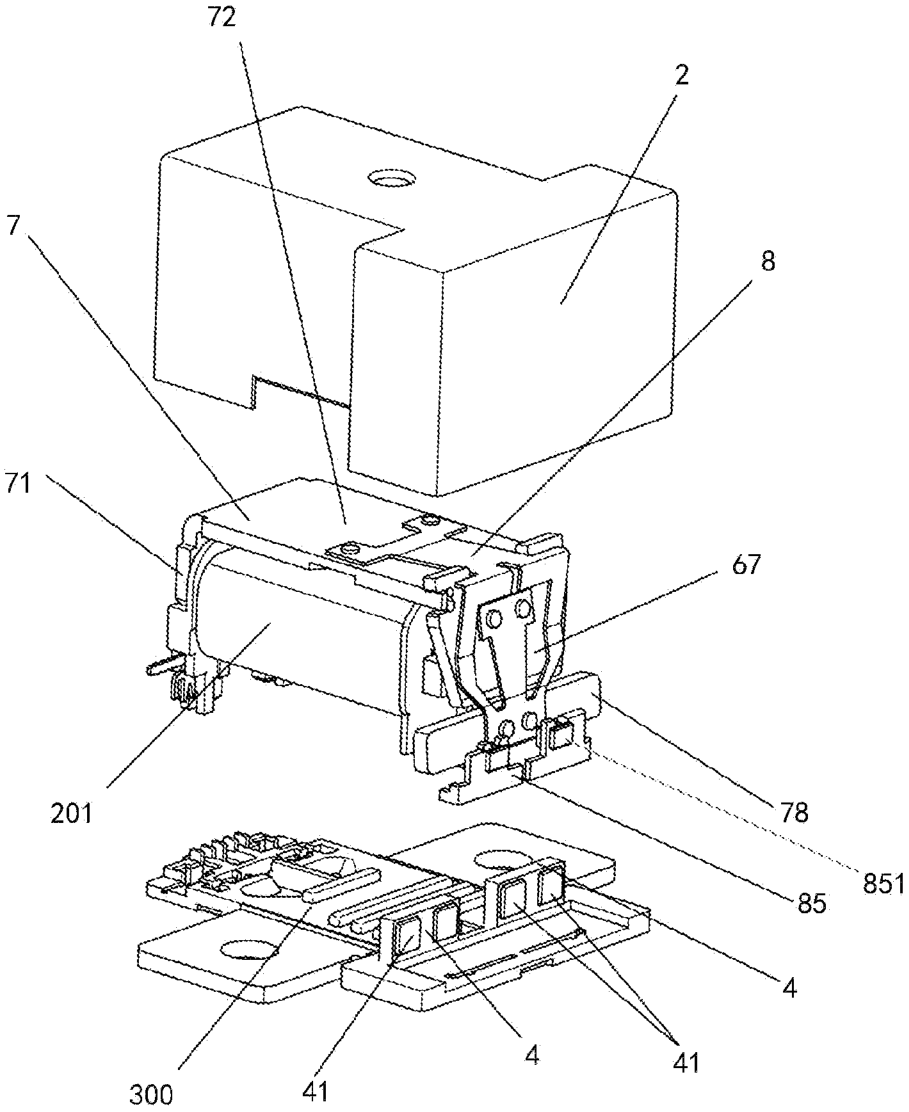
FIG. 64 is an exploded schematic perspective view of an embodiment of the present disclosure.
Figure 65:
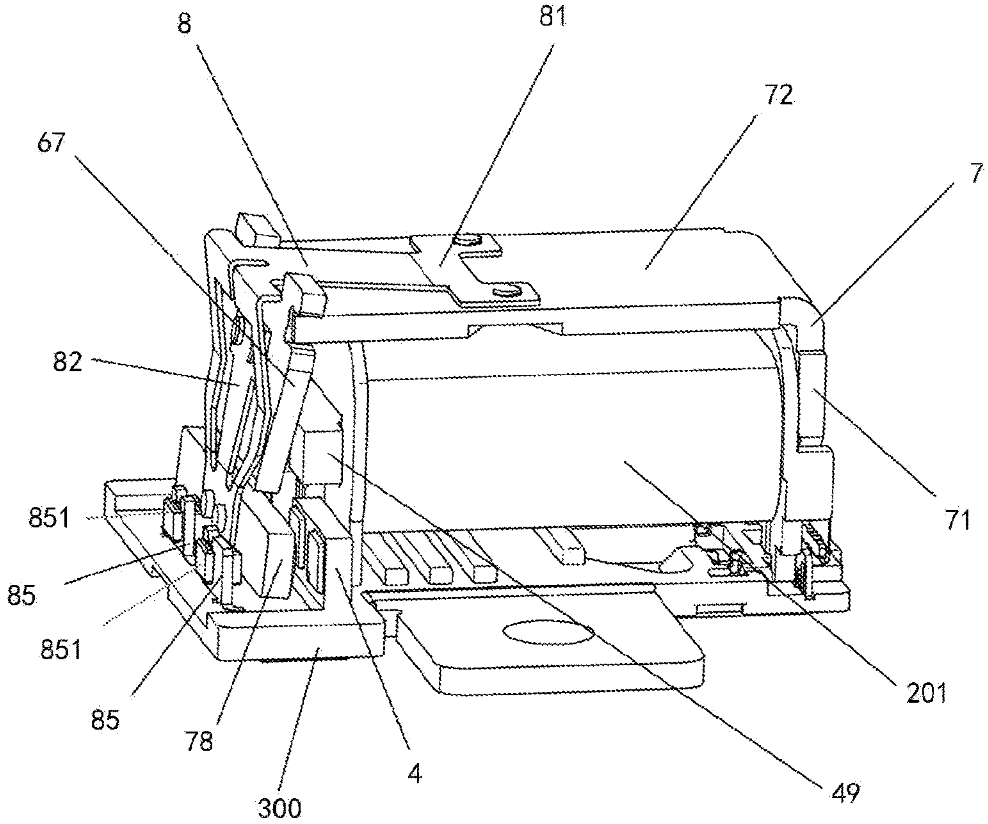
FIG. 65 is a schematic perspective view (without housing) of an embodiment of the present disclosure.
Figure 66:
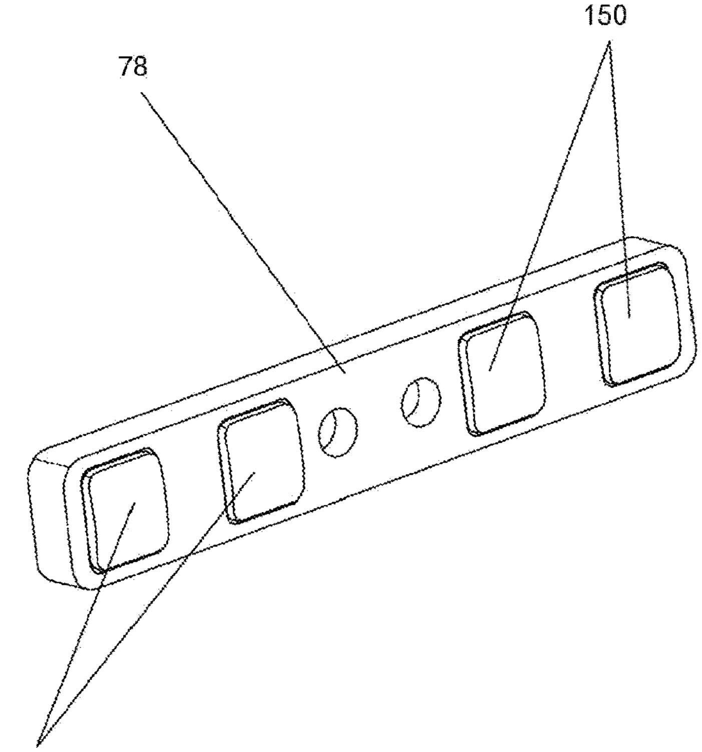
FIG. 66 is a schematic perspective view of a bridge piece according to the embodiment of the present disclosure.
Figure 67:
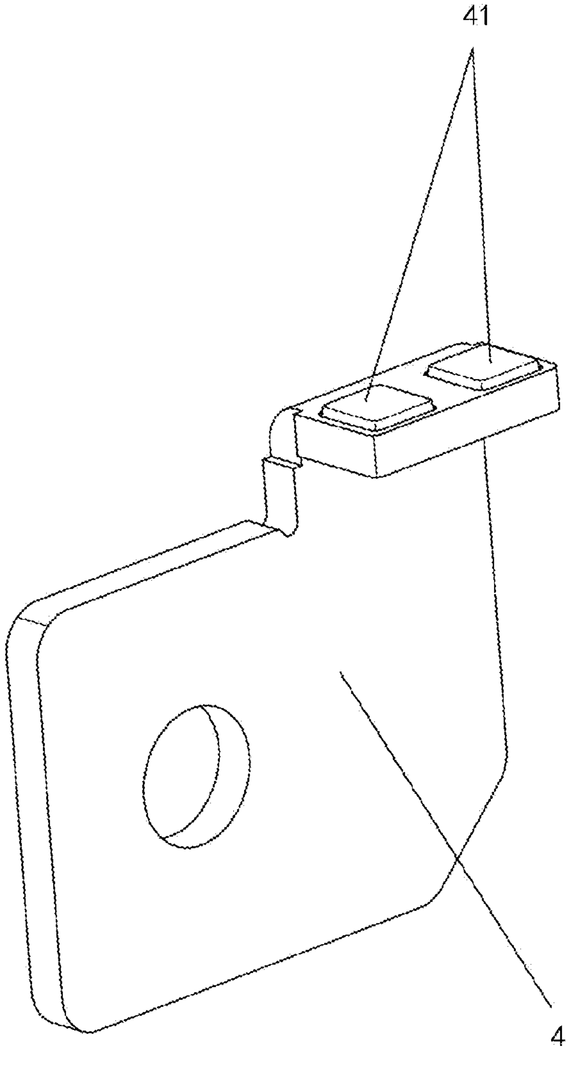
FIG. 67 is a schematic perspective view of a fixed contact piece according to the embodiment of the present disclosure.
Figure 68:
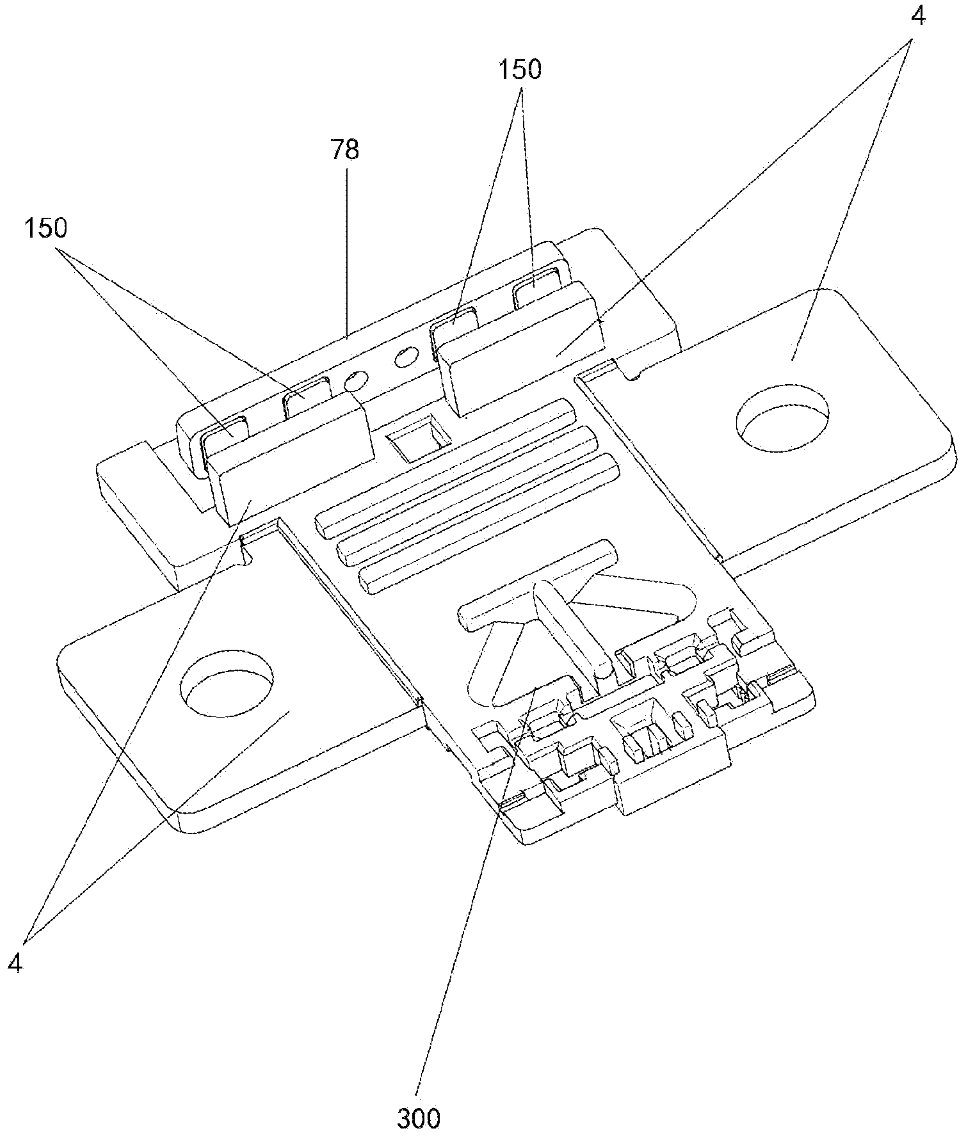
FIG. 68 is a schematic view of the cooperation of the fixed contact piece mounted on the base and the bridge piece according to the embodiment of the present disclosure.
Figure 69:
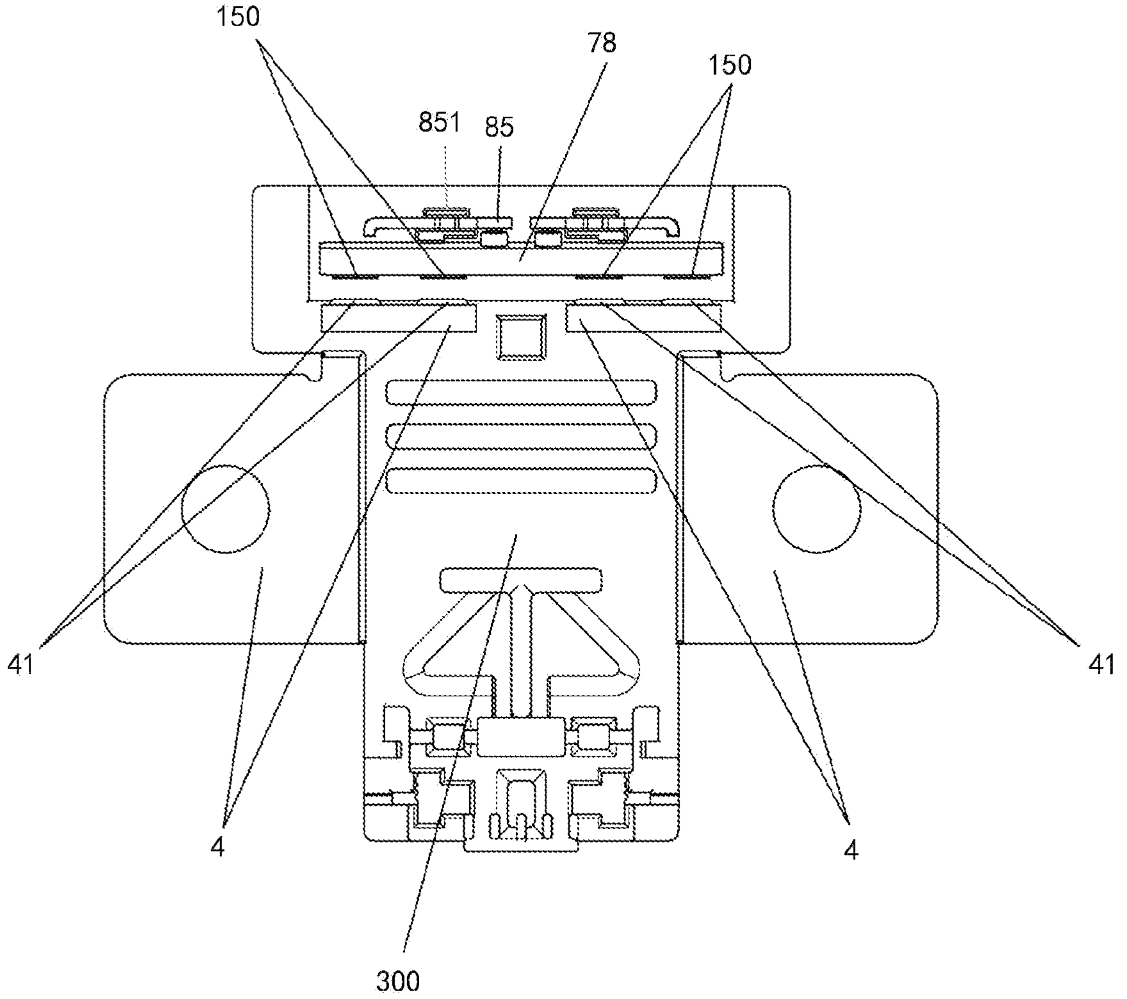
FIG. 69 is a top view of the cooperation of the fixed contact piece mounted on the base and the bridge piece according to the embodiment of the present disclosure.

Referring to FIGS. 21-23, in this embodiment, the first hook member includes two hooks 51, 52 facing oppositely and a first avoidance recess 53 between the two hooks 51, 52 so that the corresponding hook can swing elastically; and hook heads 50 of the two hooks 51, 52 face respectively the two sides directly below the axis Z of the iron core mounting hole 13.

In this embodiment, a first snap hole 311 with a stepped surface facing downward is respectively provided at a location corresponding to the hook head 50 at the bottom of the first engagement hole 310. Fins 54 for preventing overpressure are provided toward the two sides at the upper part of the first hook member 5. When the first hook member 5 is fitted into the first engagement hole 310, the hook heads 50 of the two hooks 51, 52 of the first hook member 5 is hooked at the first snap hole 311 of the first engagement hole, and the fins 54 on the two sides of the first hook member 5 abut against the base on the edge of the first engagement hole 310, such that the integral part is vertically limited at the location corresponding to the first engagement hole.

In this embodiment, the first hook member 5 is in transitional fit with two opposite hole walls of the first engagement hole 310 along a horizontal direction perpendicular to the axis of the iron core mounting hole, so that the integral member is restricted along the horizontal direction perpendicular to the axis of the iron core mounting hole at the location corresponding to the first engagement hole.

In this embodiment, the second hook member 6 includes a hook head 60 facing the outside of the bobbin 1 and a second avoidance recess 62 arranged beside the hook 61 to allow the hook 61 to elastically swing in the direction of the inside of the bobbin 1.

In this embodiment, a second snap hole 321 with a stepped surface facing downward is respectively provided at a location corresponding to the hook head 60 at the bottom of the second engagement hole 320. A third step 63 for preventing overpressure and having stepped surface facing downward are provided at the upper part of the second hook member 6. When the second hook member 6 is fitted into the second engagement hole 320, the hook head 60 of the second hook member 6 is hooked at the second snap hole 321 of the second engagement hole 320, and the third steps 63 of the second hook member 6 abut against the base 300 on the edge of the second engagement hole 320, such that the integral part is vertically limited at the location corresponding to the second engagement hole 320.

In this embodiment, the second hook member 6 is in transitional fit with the two opposite hole walls of the second engagement hole 320 along the horizontal direction perpendicular to the axis of the iron core mounting hole 13 at a location corresponding to the second engagement hole 320. One of the two opposite hole walls of the second engagement hole 320 along the horizontal direction perpendicular to the axis of the iron core mounting hole 13 is also set as a wave-shaped wall surface, so that after the over-travel adjustment of the contacts can be achieved by use of the first gap and the second gap, the heat-melting treatment between the wave-shaped wall surface 322 of the second engagement hole 320 and the second hook member 6 is performed to fix the second hook member 6 with the base 300 together so that the integral part is simultaneously restricted along the axis of the iron core mounting hole 13 and the horizontal direction perpendicular to the axis of the iron core mounting hole 13 at the location corresponding to the second engagement hole 320, and fine adjustment of the integral part along the horizontal direction perpendicular to the axis of the iron core mounting hole 13 at the location corresponding to the second engagement hole 320 can be achieved by means of the wave-shaped wall surface 322, that is to say, since the second engagement hole 320 has a wave-shaped wall surface 322, after the heat-melting treatment of the wave-shaped wall surface 322 of the second engagement hole 320 and the second hook member 6, the bobbin (and the integral part) has slight movement along the horizontal direction perpendicular to the axis of the iron core mounting hole at the location corresponding to the second engagement hole.

Furthermore, the high-current relay of the present disclosure further includes a yoke 7. The yoke 7 is provided with a mounting leg 70 which is fitted in the second engagement hole 320 together with the second hook member 6, and the mounting leg 70 of the yoke 7 is closer to directly below the axis of the iron core mounting hole 13 with respect to the second hook member 6; the other one of the two opposite hole walls of the second engagement hole 320 along the horizontal direction perpendicular to the axis of the iron core mounting hole is farther away from directly below the axis of the iron core mounting hole 13 with respect to the other one.

As for the high-current relay with an adjustable over-travel according to the present disclosure, a first hook member 5 is provided downwardly on the flange 11 at one end of the bobbin 1, and a first engagement hole 310 is provided at the corresponding position of the base 300. The first hook member 5 of the bobbin 1 is fitted into the first engagement hole 310 of the base 300 such that an integral part including the bobbin 1 and the moving spring armature 15 is restricted along a vertical direction and a horizontal direction perpendicular to the axis of the iron core mounting hole 13 at a location corresponding to the first engagement hole 310, and there is a movable first gap along the axis of the iron core mounting hole 13. A second hook member 6 is downwardly provided on the flange at the other end of the bobbin 1, and a second engagement hole 320 is provided at the corresponding position of the base 300, and the second hook member 6 of the bobbin 1 is fitted in the second engagement hole 320 of the base 300 such that the integral part is restricted along the vertical direction and the horizontal direction perpendicular to the axis of the iron core mounting hole 13 at a location corresponding to the second engagement hole 320, and there is movable second gap along the axis of the iron core mounting hole 13; so that the over-travel adjustment of the contacts can be achieved by use of the first gap and the second gap. This structure of the present disclosure can achieve the hook fixation between the bobbin 1 and the base 300, avoid the deficiencies of the prior art caused by use of the split riveting and realize the over-travel adjustment of the high-current relay.

As for the high-current relay with an adjustable over-travel according to the present disclosure, the first hook member 5 is set to one, and is arranged directly below the axis of the iron core mounting hole 13. The second hook member 6 is set to two, and are symmetrically arranged on the two sides directly below the axis of the iron core mounting hole 13. With this structure of the present disclosure, through three-point coordination between the bobbin 1 and the base 300, a stable connection can be obtained between the bobbin 1 and the base 300.

As for the high-current relay with an adjustable over-travel according to the present disclosure, the first hook member 5 includes two hooks 51, 52 facing oppositely and a first avoidance recess 53 between the two hooks 51, 52 so that the corresponding hook can swing elastically; and hook heads 50 of the two hooks face respectively the two sides directly below the axis of the iron core mounting hole 13. The second hook member 6 includes a hook head 60 facing to the hook 61 outside of the bobbin 1 and a second avoidance recess 62 arranged beside the hook to allow the hook to elastically swing in the direction of the inside of the bobbin. With this structure of the present disclosure, when the bobbin 1 is pressed into the base 300, and the first hook member 5 is inserted into the first engagement hole 310, the two hook heads 50 of the first hook member 5 are deformed towards the middle direction, and when the second hook member 6 is inserted into the second engagement hole 320, the hook heads 60 of the second hook member 6 are deformed toward the direction of the contacts, thereby reducing the difficulty of assembly between the bobbin 1 and the base 300 and solving the generation of plastic foreign objects during assembly.

As for the high-current relay with the adjustable over-travel according to the present disclosure, one of the two opposite hole walls of the second engagement hole 320 along the horizontal direction perpendicular to the axis of the iron core mounting hole 13 is also set as a wave-shaped wall surface 322. With this structure of the present disclosure, one recess sidewall of the second engagement hole 320 is designed as a wave-shaped structure, and after the over-travel is adjusted, the second hook member 6 is heat-melted, and the hot melt of the second hook member 6 fills the wave-shaped surface 322, so that the integral part can be simultaneously restricted along the axis direction of the iron core mounting hole 13 and the horizontal direction perpendicular to the axis of the iron core mounting hole 13 at the location corresponding to the second engagement hole 320, at the same time, the wave-shaped surface can increase a mating area of the hot-melt substances between the second engagement hole 320 and the hook, and thereby enhancing the fixing strength.

The First Embodiment of a Relay Capable of Ensuring the Normal Operation of an Armature or a Moving Spring Referring to FIG. 28 to FIG. 42, a relay that can ensure the normal operation of the armature or the moving spring according to the present disclosure includes a housing 2, a base 300, a coil assembly 100, an iron core 49, a yoke 7, an armature 67, and a moving spring 8. The coil assembly 100 includes a bobbin 1, an enameled wire 200 and a coil pin 3. The coil assembly 100 is horizontally mounted on the base 300. The iron core 49 is mounted in an iron core mounting hole 13 of the bobbin 1 of the coil assembly 100, and an end face of the first end of the iron core 49 is set as a pole surface. The first portion 71 of the yoke 7 is fixed to the second end of the iron core 49, and the second portion 72 of the yoke 7 is fitted over the coil assembly 100. The first portion 81 of the moving spring 8 is fixed with the second portion 72 of the yoke 7, and the second portion 82 of the moving spring 8 is fixed with the armature, and the armature corresponds to the pole surface of the iron core 49 and the upper part of the armature is fit at a knife edge of the yoke 7, and the upper end of the armature is higher than the top surface of the second portion 72 of the yoke 7 and the top surface of the first portion 81 of the moving spring 8. The housing 2 is installed on the base 300 and receives the coil assembly 100, the iron core 49, the yoke 7, the armature 67 and the moving spring 8 therein. A downwardly protruding protrusion 21 that can abut against the upper surface of the second portion 72 of the yoke is provided in an inner side surface of the top of the housing 2. A distance D1 between the bottom surface of the protrusion 21 and the upper surface of the second portion 72 of the yoke 7 is smaller than a distance D2 between the inner side surface of the top of the housing 2 and the upper end of the armature 67, so that when the housing 2 is deformed downward, the protrusion 21 abuts against the upper surface of the second portion 72 of the yoke 7, so as to ensure that the housing 2 cannot press the armature 67. The protrusion is a flat cylinder, and can also be a rib or other similar structure.

In this embodiment, there are three protrusions 21 on the inner side surface of the top of the housing 2 and are distributed in a triangle shape.

In this embodiment, in the housing 2, limiting ribs 22 that are capable to fit on both sides of the second portion 72 of the yoke are provided in the side walls corresponding to the axis of the iron core mounting hole of the coil assembly 100, and a preset gap is provided between the limiting rib 22 and the corresponding side of the second portion 72 of the yoke, to prevent the magnetic circuit including the yoke from moving in a preset direction.

In this embodiment, the yoke 7 is L-shaped, and one side of the L-shaped yoke 7 serves as the first portion 71 of the yoke, which is fixed to the second end of the iron core 49, and the other side of the L-shaped yoke serves as the second part 72 of the yoke, which is fitted on the upper side of the coil assembly 100. The moving spring 8 is L-shaped, and one side of the L-shaped moving spring serves as the first portion 81 of the moving spring, which is fixed to the yoke 7 over the second portion 72 of the yoke 7, and the other side of the L-shaped moving spring 8 serves as the second portion 82 of the moving spring, and the second portion 82 is fixed to the armature 67.

In this embodiment, the two sides of the end of the second portion 72 of the yoke respectively extend outwardly and are provided with protruding columns 721, and a knife edge of the yoke is formed between the two protruding columns 721. A first groove 671 is respectively provided on the both sides of the upper part of the armature. The first grooves 671 on both sides of the upper part of the armature are respectively matched with the two protruding columns 721 at the end of the second portion 72 of the yoke, so that the upper part of the armature 67 fits at the knife edge of the yoke 7.

In this embodiment, a second groove 672 is provided at a top end of the armature 67, and the first portion 81 of the moving spring 8 crosses the second groove 672 at the top end of the armature 67 so that the top end of the armature 67 is higher than the top surface of the second portion 72 of the yoke 7 and the top surface of the first portion 81 of the moving spring 8.

In this embodiment, a stopper 811 for limiting the top of the armature is also provided in the first portion 81 of the moving spring 8, so as to limit the upper part of the armature 67 at the knife edge of the yoke 7.

As for the relay that can ensure the normal operation of the armature or the moving spring according to the present disclosure, a downwardly protruding protrusion 21 that can abut against the upper surface of the second portion of the yoke is provided in an inner side surface of the top of the housing 2. A distance D1 between the bottom surface of the protrusion 21 and the upper surface of the second portion of the yoke is smaller than a distance D2 between the inner side surface of the top of the housing and the upper end of the armature. With this structure of the present disclosure, when the top of the housing 2 is deformed by force, the housing 2 can simultaneously move the protrusion 21 downwards to be in a first contact with the yoke 7, to avoid contact between the housing 2 and the armature 67, and jamming the armature 67, and ensure the normal operation of the armature 67, thereby ensuring the normal use of the relay.

As for the relay that can ensure the normal operation of the armature or the moving spring according to the present disclosure, there are three protrusions 21 on the inner side surface of the top of the housing 2, and are distributed in a triangle shape. This structure of the present disclosure can ensure that the top of the housing 2 when being deformed under force is in smooth contact with the yoke 7, and that the housing 2 is not in contact with the armature 67, and ensure the normal operation of the armature 67.

As for the relay that can ensure the normal operation of the armature or the moving spring according to the present disclosure, the limiting ribs 22 that are capable to fit on both sides of the second portion of the yoke are provided in the side walls of the housing 2 corresponding to the axis of the iron core mounting hole of the coil assembly, and a preset gap is provided between the limiting rib 22 and the corresponding side of the second portion 72 of the yoke. This structure of the present disclosure can prevent the magnetic circuit including the yoke from moving in a preset direction.

The Second Embodiment of Relay Capable of Ensuring the Normal Operation of the Armature or the Moving Spring Referring to FIGS. 34 to 42, a relay capable of ensuring the normal operation of the armature or moving spring according to the present disclosure differs from the first embodiment in that shoulders 673 are respectively provided on both sides of the upper part of the armature 67. The shoulders 673 on both sides of the upper part of the armature 67 are respectively matched with the two protruding columns 721 at the end of the second portion 72 of the yoke, so that the upper part of the armature 67 is fit at the knife edge of the yoke 7.

The first portion 81 of the moving spring 8 crosses the top end of the armature 67, so that the upper end of the moving spring 8 is higher than the top surface of second portion 72 of the yoke and the armature 67.

A distance D1 between the bottom surface of the protrusion 21 and the upper surface of the second portion of the yoke is smaller than a distance D3 between the inner side surface of the top of the housing 2 and the upper end of the moving spring 8.

When the top of the housing 2 is deformed by force, the housing 2 can simultaneously move the protrusion 21 downwards to be in a first contact with the yoke 7, to avoid contact between the housing 2 and the moving spring 8, and jamming the moving spring 8, and ensure the normal operation of the moving spring 8, thereby ensuring the normal use of the relay.

The First Embodiment of a High-Current Relay with Signal Monitoring on Load Terminals Refer to FIG. 43 to FIG. 54, a high-current relay with signal monitoring on the load terminals according to the present disclosure includes a housing 2, a machine core 8 and a base 300. The housing 2 is mounted on the base 300 and receives the machine core 8 therein. The machine core 8 includes a magnetic circuit 81 and a moving spring armature 15 operated by the magnetic circuit. The moving spring armature 15 includes a bridge piece 78 and movable contacts 150 arranged on both ends of the bridge piece 78. the movable contacts 150 of this embodiment are separate parts and are fixed on the bridge piece 78, of course, the movable contacts can also be integrally formed with the bridge piece 78 and protrude from the bridge piece 78, or the ends of the bridge piece 78 directly form the movable contacts. The base 300 includes two fixed contact pieces 4 and a plastic body 92 that fixes the two fixed contact pieces 4 insulated from each other together by an injection molding. The fixed contact piece 4 has a sheet-shaped structure and includes a main body 911 buried horizontally in the plastic body, a contact part 912 bent to be exposed over the plastic body 92, and a connection part 913 exposed horizontally from the side of the plastic body as a load terminal. The fixed contacts 914 are provided at the contact part 912. The fixed contacts 914 of this embodiment are separate parts and are fixed to the contact part 912 of the fixed contact piece 4. Of course, the fixed contacts can also be formed integrally with the contact part 912 of the fixed contact piece 4 and protrude from the contact part 912 of the fixed contact piece, or the contact part 912 of the fixed contact piece 4 directly forms the fixed contact. The machine core 8 is installed on the base 300, and the two ends of the bridge piece 78 of the machine core 8 are matched with the contact parts 912 of the two fixed contact pieces 4, so that when the contacts are closed, that is the movable contacts 150 on the two ends of the bridge piece 78 are correspondingly in contact with the fixed contacts 41 of the contact part 912 of the two fixed contact pieces 4, the current flows in from the load terminal of one of the fixed contact pieces and flows out from the load terminal of the other of the fixed contact pieces. The main bodies 911 of the two fixed contact pieces 4 are also provided with protruding parts 42 that protrudes upward and is not covered by the plastic body 92, and the protruding parts 42 of the two fixed contact pieces 4 are respectively connected with a signal wire 400, to realize signal collection of the closed state of the contacts and the number of opening and closing times of the contacts.

A metal conductive sheet 65 is also provided between the signal wire 400 and the protruding part 42 of the fixed contact piece. The metal conductive sheet 65 is provided with a first through hole 610 fitted to the protruding part 42 of the fixed contact piece 4. The metal conductive sheet 65 is connected to the protruding part of the fixed contact piece by means of welding or riveting.

In this embodiment, one end of each of the two signal wires 400 is connected to a corresponding metal conductive sheet 65, and the other end of each of the two signal wires 400 is connected to a connector 700, and connected to a control module outside the relay by means of the connector 700.

In this embodiment, the protruding part 42 of the fixed contact piece and the main body 911 of the fixed contact piece are separate parts. The protruding part 42 of the fixed contact piece is a metal rivet, and the corresponding position of the main body 911 of the fixed contact piece is provided with a second through hole 915. The metal rivet is fitted in the second through hole 915 of the main body 911 of the fixed contact piece, and the bottom of the metal rivet is riveted and matched with the second through hole 915 of the main body 911 of the fixed contact piece.

In this embodiment, a step 421 is provided on the top of the metal rivet, and the first through hole 610 of the metal conductive sheet 65 is fitted at the step 421 of the metal rivet and is fixed by the way of riveting.

In this embodiment, the signal wire 400 is a flexible wire.

As for the high-current relay with signal monitoring on the load terminals according to the present disclosure, the main bodies 911 of the two fixed contact pieces 4 are also provided with a protruding part 42 that protrudes upward and is not covered by the plastic body, and the protruding parts 42 of the two fixed contact pieces 4 are respectively connected with a signal wire 400, to realize signal collection of the closed state of the contacts and the number of opening and closing times of the contacts. With this structure of the present disclosure, by adding a simple device of signal lead-out wire on the fixed contact piece, when the contacts are closed, the two signal wires 400 are communicated, and the communicated signals of the two signal wires 400 can be collected, on the one hand, to monitor the state of the contacts in real time, determine whether the relay is in normal work, and check the risks timely; on the other hand, to collect and count the number of opening and closing times of the relay, when the number of failures is reached, it can automatically remind replacement or repair, so as to ensure the normal application of the relay. The present disclosure allows the relay to possess a signal monitoring function.

As for the high-current relay with signal monitoring on the load terminals according to the present disclosure, the protruding part 42 of the fixed contact piece and the main body 911 of the fixed contact piece are separate parts; the protruding part 42 of the fixed contact piece is a metal rivet, and the corresponding position of the main body 911 of the fixed contact piece is provided with a second through hole 915; the metal rivet is fitted in the second through hole 915 of the main body 911 of the fixed contact piece, and the bottom of the metal rivet is riveted and matched with the second through hole of the main body of the fixed contact piece. This structure of the present disclosure is convenient for manufacturing the protruding parts 42 of the fixed contact pieces 4, and when the protruding parts 42 of the fixed contact pieces 4 are matched with the metal conductive sheet, it will not cause damage to the plastic body. Since the metal rivet is a solid body, the stability of the contact between the metal conductive sheet and the protruding parts 42 of the fixed contact pieces 4 can be improved.

As for the high-current relay with signal monitoring on the load terminals according to the present disclosure, a step 421 is provided on the top of the metal rivet, and the first through hole 610 of the metal conductive sheet 65 is fitted to the step 421 of the metal rivet. With the structure of the present disclosure, the conductive area of the metal conductive sheet 65 and the fixed contact piece 4 can be increased by means of the step 421 of the metal rivet, so as to improve the reliability of conduction.

As for the high-current relay with signal monitoring on the load terminals according to the present disclosure, the signal wire 400 is a flexible wire, and one end of the signal wire 400 is connected to the metal conductive sheet 65, and the other end of the signal wire 400 is connected to a connector 700. The present disclosure uses the flexible wire to eliminate stress generated between the hard connections (a direct connection between the metal sheets easily causes falling off, thereby improving the reliability of connection.

The Second Embodiment of a High-Current Relay with Signal Monitoring on the Load Terminals Referring to FIG. 55 to FIG. 58, the high-current relay with signal monitoring on the load terminals according to the present disclosure differs from the first embodiment in that the protruding part of the fixed contact piece is formed differently. In this embodiment, the protruding part 42 of the fixed contact piece and the main body 911 of the fixed contact piece are an integral structure, which is formed by tapping the main body 911 of the fixed contact piece upward from the bottom surface.

The Third Embodiment of the High-Current Relay with Signal Monitoring on the Load Terminals Referring to FIG. 59 to FIG. 63, the high-current relay with signal monitoring on the load terminals according to the present disclosure differs from the second embodiment in that in the plastic body 92, a relief area is also provided on the periphery corresponding to the protruding parts 42 of the two fixed contact pieces, that is, when the two fixed contact pieces 4 are injection molded to form the base 300, the protruding part 42 is not covered by the plastic, and no plastic is arranged along a circle next to the protruding part 42, so that the main body 911 of the fixed contact piece at this position is also exposed, and the protruding parts 42 of the two fixed contact pieces are respectively sleeved with a spring 95, and the spring 95 is compressed between the metal conductive sheet 65 and the main body 911 of the fixed contact piece in the corresponding relief area, so as to increase the electrical contact area between the metal conductive sheet 65 and the fixed contact piece 4 by means of the spring 95. The spring 95 serves to communicate the load terminal (i.e., the fixed contact piece 4) with the signal wire connection terminal (i.e., the metal conductive sheet 65).

As for the high-current relay with signal monitoring on the load terminals according to the present disclosure, in the plastic body 92, a relief area is also provided on the periphery corresponding to the protruding parts 42 of the two fixed contact pieces 4, and the protruding parts of the two fixed contact pieces are respectively sleeved with springs 95, and the springs 95 are compressed between the metal conductive sheet 65 and the main body 911 of the fixed contact piece in the corresponding relief areas. With this structure of the present disclosure, by use of the deformability of the spring 95, the spring 95 after being deformed is always in contact with the metal conductive sheet 65 and the main body 911 of the fixed contact piece, so as to ensure a reliable connection between a signal diagnostic terminal (i.e., the metal conductive sheet) and a load terminal (i.e., the main body of the fixed contact piece), further ensure the transmission of the diagnostic signal, and thereby ensuring effective reading of the monitoring signal by the system.

The Embodiment of a Bridge-Type High-Current Electromagnetic Relay

Referring to FIG. 64 to FIG. 69, the bridge-type high-current electromagnetic relay of the present disclosure includes a housing 2, a base 300, two fixed contact pieces 4 with rigid characteristics mounted on the base 300, a coil 201 horizontally mounted on the base 300, and a moving spring 8 with flexible characteristics connected between the armature 67 and the yoke 7 fit to the vicinity of the coil 201. A bridge piece 78 with rigid characteristics is also fixed at an end of the moving spring 8 connected to the armature 67. The two ends of the bridge piece 78 respectively correspond to the two fixed contact pieces 4, and each of the fixed contact pieces 4 is provided with two fixed contacts 41, the two ends of the bridge piece 78 are respectively provided with two movable contacts 150, and the four movable contacts 150 are arranged in a row. The two fixed contacts 41 on the fixed contact piece 4 are also arranged horizontally, and one end of the iron core 49 is set as a pole surface, and the other end of the iron core 49 is fixed to the yoke 7.

The yoke 7 is L-shaped, and one side of the L-shaped yoke 7 is the first portion 71 that is fixed to the other end of the iron core 49; the other side of the L-shaped yoke 7 is the second portion 72 that is arranged beside the coil (i.e., outside the winding window of the bobbin). In this embodiment, the second portion 72 of the yoke 7 is arranged on the coil 201, and the end head of the second portion 72 of the yoke 7 is used as a knife edge of the yoke to be matched with the armature 67.

The moving spring 8 with flexible features is also bent into substantially L-shaped. One side of the L-shaped moving spring 8 is the first portion 81 that is fixed to the second portion 72 of the yoke 7; and the other side of the L-shaped moving spring 8 is the second portion 82 that is fixed to the armature 67, so that the armature 67 can be attracted to the pole surface of the fixed contact piece 4 by taking the knife edge of the yoke 7 as a rotation axis. When the coil 201 works, the armature 67 is attracted to the pole surface of the iron core 49, the armature 67 drives the swinging of the second portion 82 of the moving spring 8, and the second portion 82 of the moving spring 8 then drives the movement of the bridge piece 78, so that the two ends of the bridge piece 78 are in contact with two fixed contacts 41, and the two movable contacts 150 on both ends of the bridge piece 78 are in contact with the two fixed contacts 41 on the two fixed contact pieces 4 respectively.

In this embodiment, the two movable contacts 150 on both ends of the bridge piece 78 and the two fixed contacts 41 on the two fixed contact pieces 4 are respectively configured to have a square structure.

In this embodiment, the contact surfaces of the two movable contacts 150 on both ends of the bridge piece 78 and the two fixed contacts 41 on the two fixed contact pieces 4 are respectively configured as arc surfaces protruding outward.

In this embodiment, the two fixed contact pieces 4 are respectively arranged between the bridge piece 78 and the coil 201.

In this embodiment, the two fixed contact pieces 4 are symmetrically installed on both sides of the base 300 respectively.

In this embodiment, the base 300 is provided with a stopper 85 on the side corresponding to the bridge piece 78 and facing away from the movable contact. There are also two stoppers 85. The stoppers 85 in this embodiment are separate parts and are mounted on the base 300. Of course, the stopper 85 may also be integrally formed by the base.

In this embodiment, the stopper 85 is also provided with a buffer pad 851. The buffer pad 851 is used to reduce the noise when the relay is released. When the relay is released, the bridge piece 78 can lean against the stopper 85 along with the release of the armature 67. Since the stopper 85 has the buffer pad 851, an impact force of the bridge piece 78 can be eliminated, and thereby reducing the noise generated by the impact.

As for the bridge-type high-current electromagnetic relay according to the present disclosure, each of the fixed contact pieces 4 is provided with two fixed contacts 41, the two ends of the bridge piece 78 are respectively provided with two movable contacts 150, and the four movable contacts 150 are arranged in a row. When the coil 201 works to allow the two ends of the bridge piece 78 to be in contact with the two fixed contact pieces 4, the two movable contacts 150 on the both ends of the bridge piece 78 are respectively in a corresponding contact with the two fixed contacts 41 on the two fixed contact pieces 4. With the structure of the present disclosure, each of the load terminals (i.e., fixed contact pieces) is simultaneously provided with two contacts connected in parallel, and correspondingly, the bridge piece of the movable spring is provided with four contacts, and the contacts on the bridge piece correspond to the contacts on the load terminal respectively. The two load terminals (i.e., fixed contact pieces) are connected in series through the bridge piece. When the contacts are communicated in the load terminal, the contacts are connected in parallel to make the equivalent resistance halved (also equivalent to current shunt to improve the current-carrying capacity), so that under the same current condition, the power consumption is reduced by ½, thereby greatly reducing the power consumption of the contacts, that is, reducing the heating at the contacts, thereby improving the product performance (i.e., the load capacity is higher. The two load terminals are connected in series with the help of the bridge piece, so that synchronous disconnection of the current loop makes the appeared arc energy halved, so as to achieve the purpose of reducing the arcing when the contacts are broken. On the other aspect, when the double contacts are communicated with the load end, the double contacts play a role of current shunt, so the current carried by a single contact is ½ of the original. According to a principle of Q=I2RT, under the same current condition, the heating amount is reduced to ¼ of the original, the heating amount of the contacts is greatly reduced, thereby improving the product performance.

As for the bridge-type high-current electromagnetic relay according to the present disclosure, the two movable contacts 150 on both ends of the bridge piece 78 and the two fixed contacts 41 on the two fixed contact pieces 4 are respectively configured to have a square structure, and the contact surfaces of the two movable contacts 150 on both ends of the bridge piece 78 and the two fixed contacts 41 on the two fixed contact pieces 4 are respectively configured as arc surfaces protruding outward. With the structure of the present disclosure, contact between the movable and fixed contacts is configured to be in a line contact by the cooperation of the square structure and the arc-shaped surface, so as to improve the reliability of the contact between the movable and fixed contacts.

As for the bridge-type high-current electromagnetic relay according to the present disclosure, a bridge piece 78 with rigid characteristics is fixed to the end of the moving spring 2 connected with the armature 67, and the two ends of the bridge piece 78 correspond to the two fixed contact pieces 4 respectively. With this structure of the present disclosure, the moving spring 2 only bear the mechanical fatigue strength of back and forth movement of the moving spring but not bear the current-carrying capacity, while the bridge piece 78 only bears the current-carrying capacity but not the load-resistant mechanical fatigue capacity. In the case of the same arc extinguishing capability, the materials of the moving spring can be randomly selected but not limited to a special material, and the load circuit path is shorter (the current only flows through the bridge piece 78 and not through the moving spring 2), that is, the shorter path has a smaller resistance, so under the same load (current) condition, the heating amount will be smaller.

It should be understood that this disclosure would never be limited to the detailed construction and arrangement of components as set forth in this specification. The present disclosure has other implementations that are able to be practiced or carried out in various ways. The foregoing variations and modifications fall within the scope of this disclosure. It should be understood that the present disclosure would contain all alternative combination of two or more individual features as mentioned or distinguished from in the text and/or in the drawings. All of these different combinations constitute a number of alternative aspects of the present disclosure. The implementations as illustrated in this specification are the best modes known to achieve the present disclosure and will enable the person skilled in the art to realize the present disclosure.

What is claimed is:

1. A relay coil assembly, comprising:

a bobbin, provided with two flanges on two ends, a winding window of the bobbin being formed between the two flanges;

an enameled wire, wound in the winding window;

a coil pin comprising an insertion portion, an enameled wire fixing portion and a signal wire fixing portion, the coil pin is mounted to the flange on one of the ends of the bobbin through the insertion portion, the signal wire fixing portion is provided with a first engagement recess with an opening facing downward; and a signal wire, engaged in the first engagement recess;

wherein an inverted hook is provided at one of two recess sidewalls of the first engagement recess and near an edge of the opening, and a slope section is provided at one of the two recess sidewalls of the first engagement recess at a location corresponding to the signal wire, the opening gradually enlarges from inside to outside along the slope section, so that when a force is applied to outside of one of the recess sidewalls provided with the inverted hook, the slope section is capable to squeeze the signal wire into the first engagement recess and the inverted hook is capable to prevent the signal wire from coming out.

2. The relay coil assembly according to claim 1, wherein after the signal wire is engaged in the first engagement recess of the coil pin, the signal wire is fixed to the coil pin by means of welding.

3. The relay coil assembly according to claim 2, wherein both the slope section and the inverted hook are provided on one recess sidewall of the first engagement recess, and the other recess sidewall of the first engagement recess is configured as a straight-surfaced wall.

4. The relay coil assembly according to claim 3, wherein the inverted hook comprises one inverted hook.

5. The relay coil assembly according to claim 3, further comprising a plurality of additional inverted hooks, wherein the plurality of additional inverted hooks and the inverted hook are arranged in order inwardly from an edge of the opening.

6. The relay coil assembly according to claim 3, wherein the coil pin further comprises an electronic component fixing portion, the electronic component fixing portion is provided with a second engagement recess having an opening facing downward, and the second engagement recess is provided on a side of the first engagement recess.

7. The relay coil assembly according to claim 6, wherein the straight-surfaced wall of the first engagement recess is closer to the second engagement recess than the recess sidewall having the slope section of the first engagement recess.

8. The relay coil assembly according to claim 6, wherein: the coil pin is a sheet-shaped structure; an iron core mounting hole of a bobbin has a horizontally arranged axis; the insertion portion is provided at an upper middle portion of the coil pin and fitted into a fitting recess of the flange on one of ends of the bobbin; the signal wire fixing portion and the electronic component fixing portion are provided on a lower part of the coil pin; a middle part of the coil pin extends to one side to form the enameled wire fixing portion, the enameled wire fixing portion is bent to the winding window of the bobbin after the coil pin is mounted to the bobbin.

9. The relay coil assembly according to claim 8, wherein the enameled wire fixing portion of the coil pin is further provided with a first tooth-shaped structure for positioning and winding the enameled wire.

10. The relay coil assembly according to claim 8, wherein the insertion portion of the coil pin is further provided with a second tooth-shaped structure for realizing an interference fit with the fitting recess of the bobbin.

11. The relay coil assembly according to claim 1, wherein both the slope section and the inverted hook are provided on one recess sidewall of the first engagement recess, and the other recess sidewall of the first engagement recess is configured as a straight-surfaced wall.

12. The relay coil assembly according to claim 11, wherein the inverted hook comprises one inverted hook.

13. The relay coil assembly according to claim 11, further comprising a plurality of additional inverted hooks, wherein the plurality of additional inverted hooks and the inverted hook are arranged in order inwardly from an edge of the opening.

14. The relay coil assembly according to claim 11, wherein the coil pin further comprises an electronic component fixing portion, the electronic component fixing portion is provided with a second engagement recess having an opening facing downward, and the second engagement recess is provided on a side of the first engagement recess.

15. The relay coil assembly according to claim 14, wherein the straight-surfaced wall of the first engagement recess is closer to the second engagement recess than the recess sidewall having the slope section of the first engagement recess.

16. The relay coil assembly according to claim 14, wherein: the coil pin is a sheet-shaped structure; an iron core mounting hole of a bobbin has a horizontally arranged axis; the insertion portion is provided at an upper middle portion of the coil pin and fitted into a fitting recess of the flange on one of ends of the bobbin; the signal wire fixing portion and the electronic component fixing portion are provided on a lower part of the coil pin; a middle part of the coil pin extends to one side to form the enameled wire fixing portion, the enameled wire fixing portion is bent to the winding window of the bobbin after the coil pin is mounted to the bobbin.

17. The relay coil assembly according to claim 16, wherein the enameled wire fixing portion of the coil pin is further provided with a first tooth-shaped structure for positioning and winding the enameled wire.

18. The relay coil assembly according to claim 16, wherein the insertion portion of the coil pin is further provided with a second tooth-shaped structure for realizing an interference fit with the fitting recess of the bobbin.

* * * * *